United States Patent
Sowinski

(10) Patent No.: US 9,930,838 B2
(45) Date of Patent: Apr. 3, 2018

(54) GRID SHOOT POSITIONING SYSTEM FOR GRAPE VINES

(71) Applicant: Stan Sowinski, Scott Township, PA (US)

(72) Inventor: Stan Sowinski, Scott Township, PA (US)

(*) Notice: Subject to any disclaimer, the term of this patent is extended or adjusted under 35 U.S.C. 154(b) by 0 days.

(21) Appl. No.: 15/618,534

(22) Filed: Jun. 9, 2017

(65) Prior Publication Data

US 2017/0347540 A1 Dec. 7, 2017

Related U.S. Application Data

(62) Division of application No. 14/630,225, filed on Feb. 24, 2015, now Pat. No. 9,717,189.

(60) Provisional application No. 61/971,339, filed on Mar. 27, 2014.

(51) Int. Cl.
*A01G 17/00* (2006.01)
*A01G 17/06* (2006.01)
*A01G 17/02* (2006.01)

(52) U.S. Cl.
CPC .......... *A01G 17/06* (2013.01); *A01G 17/005* (2013.01); *A01G 17/02* (2013.01)

(58) Field of Classification Search
CPC .. A01G 17/06; A01G 2017/065; A01G 17/08; A01G 17/04; A01G 17/00; A01G 17/005
See application file for complete search history.

(56) References Cited

U.S. PATENT DOCUMENTS

| | | | | |
|---|---|---|---|---|
| 1,480,917 A * | 1/1924 | Robinson | ............... | A01G 17/06 47/44 |
| 1,487,779 A * | 3/1924 | Hardy | ............... | A01G 17/04 47/44 |
| 4,082,831 A * | 4/1978 | Hase | ............... | A01G 9/12 264/249 |
| 4,578,896 A * | 4/1986 | Brown | ............... | A01G 17/06 403/391 |
| 5,094,029 A * | 3/1992 | Packett | ............... | A01G 9/12 47/44 |
| 5,272,834 A * | 12/1993 | Jarahian | ............... | A01G 17/06 211/119.01 |
| 5,331,764 A * | 7/1994 | Sun | ............... | A01G 17/06 248/156 |
| 8,499,492 B2 * | 8/2013 | Kassouni | ............... | A01G 9/12 47/45 |
| 8,813,422 B1 * | 8/2014 | Laudenklos | ............... | A01G 9/12 47/44 |
| 9,357,716 B1 * | 6/2016 | Takeda | ............... | A01G 17/06 |
| 2004/0093792 A1 * | 5/2004 | Avery | ............... | A01G 9/12 47/47 |
| 2005/0252076 A1 * | 11/2005 | Schloesser | ............... | A01G 17/06 47/46 |

(Continued)

*Primary Examiner* — Monica L Williams
(74) *Attorney, Agent, or Firm* — Martin J. Dowling

(57) ABSTRACT

An apparatus and method for training a grape vine. The apparatus is a linear grid composed of transverse and longitudinal elements that are configured to result in a network of spaces that are sized to substantially provide a separate space for each vine shoot. The apparatus is mobile within the vine canopy serving various functions as the growing season progresses. The mobility of the grid apparatus allows repositioning throughout the growing season while still retaining the shoots within the grid openings.

25 Claims, 19 Drawing Sheets

(56) References Cited

U.S. PATENT DOCUMENTS

| | | | |
|---|---|---|---|
| 2012/0011773 A1* | 1/2012 | Cross | A01G 9/026 47/65.8 |
| 2012/0227318 A1* | 9/2012 | Harger | A01G 9/12 47/46 |
| 2014/0041292 A1* | 2/2014 | Babcock | A01G 17/04 47/31 |
| 2014/0101995 A1* | 4/2014 | Hernandez, Jr. | A01G 9/122 47/44 |
| 2014/0305040 A1* | 10/2014 | Hall | A01G 9/12 47/65.5 |

* cited by examiner

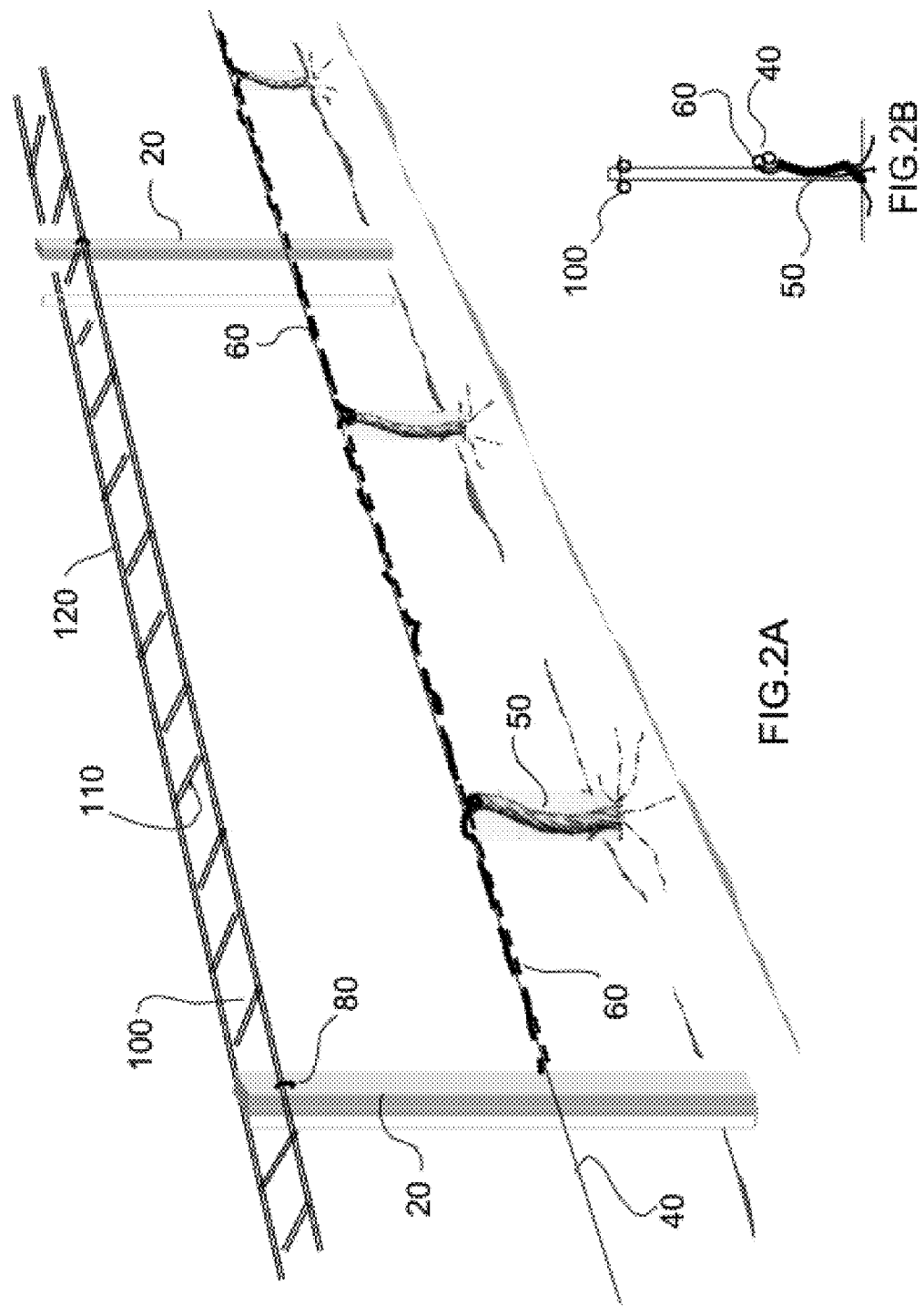

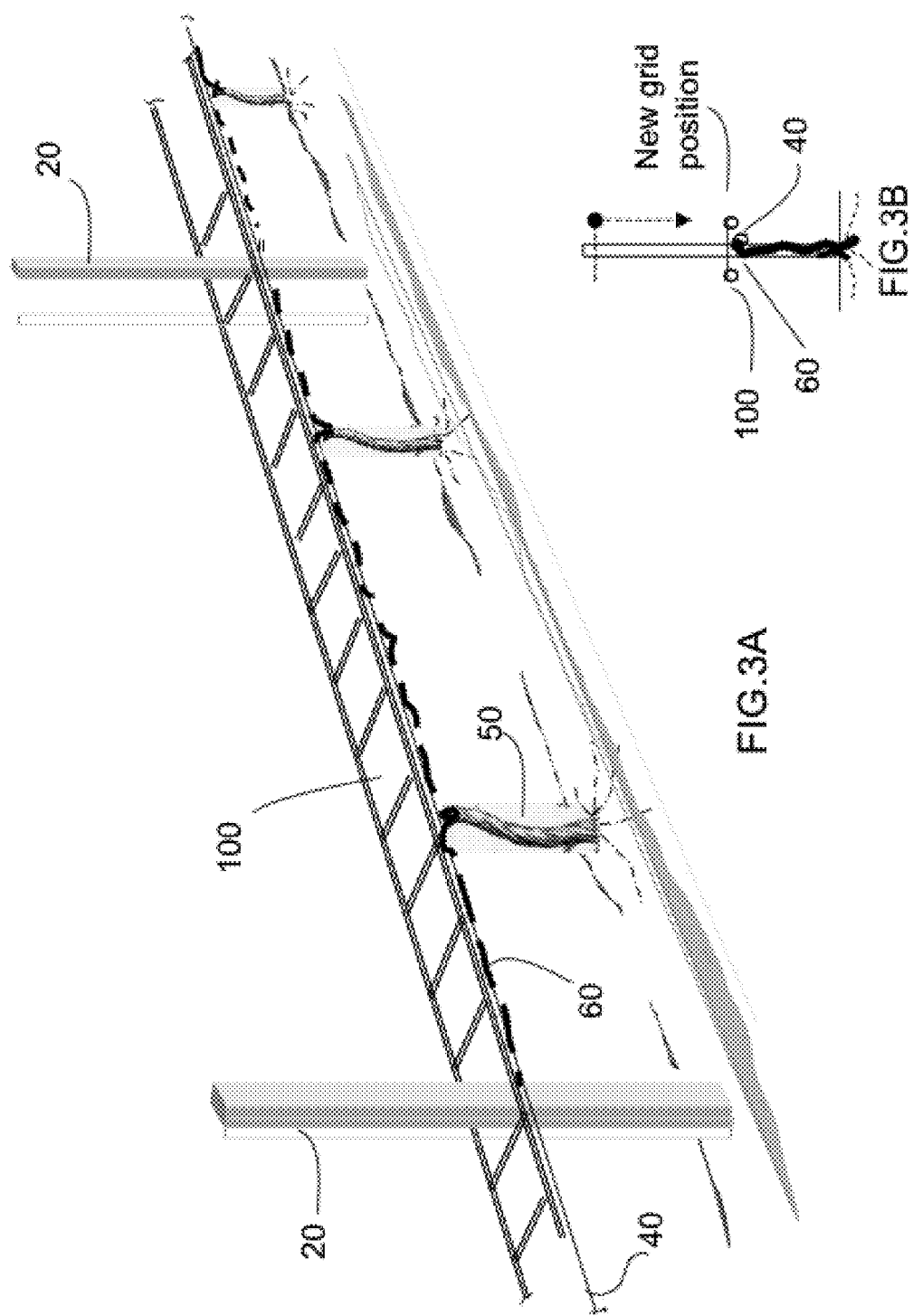

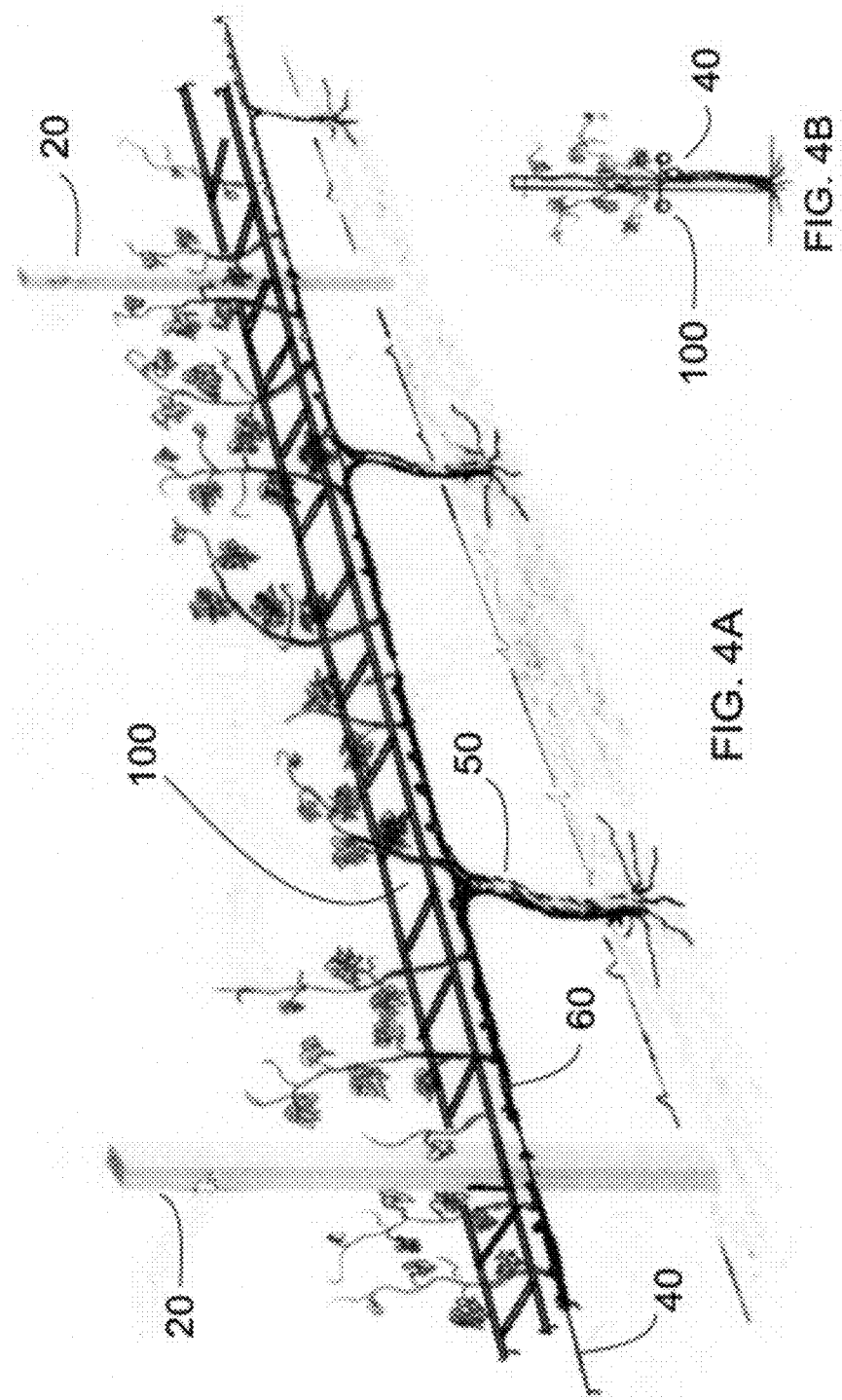

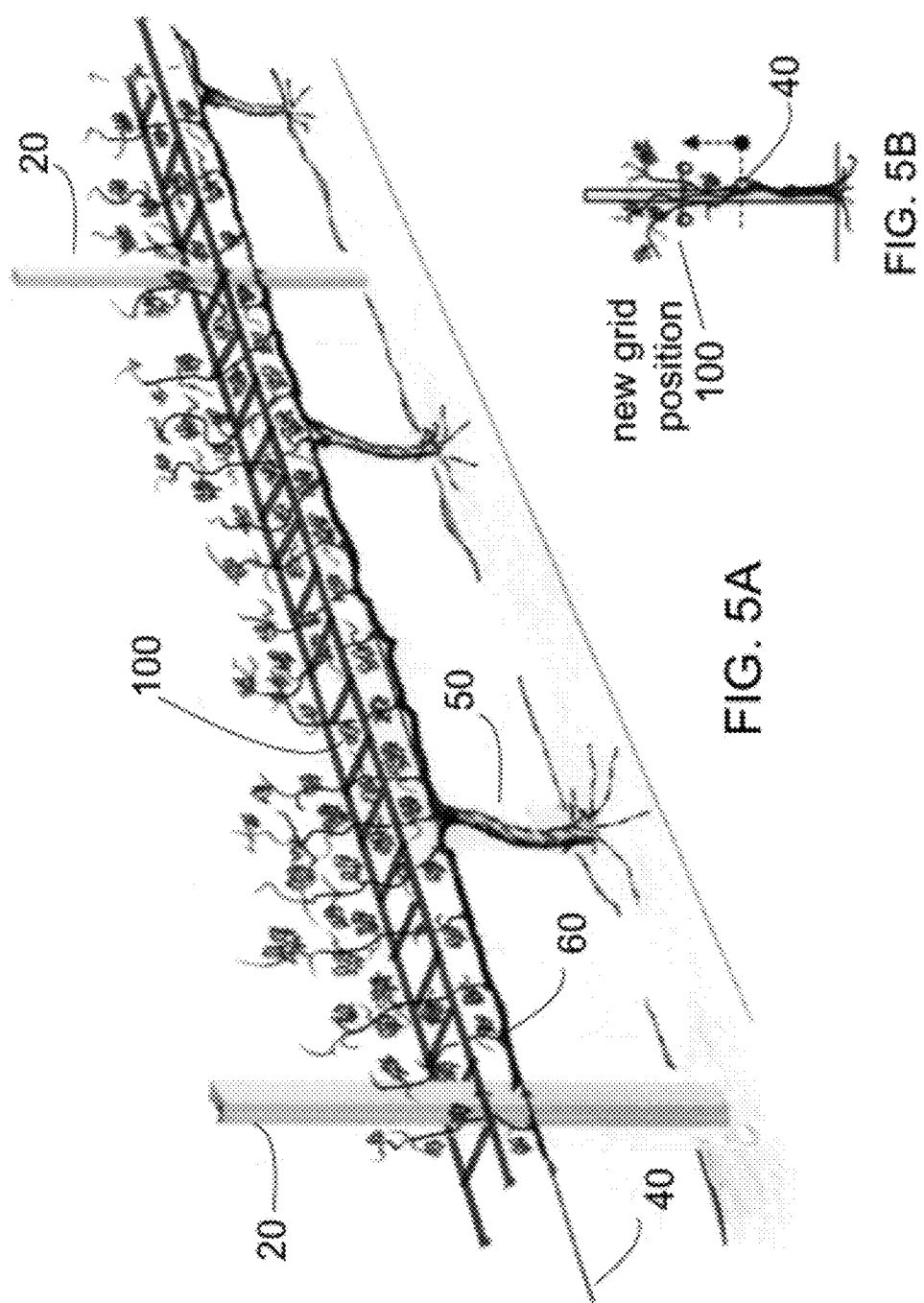

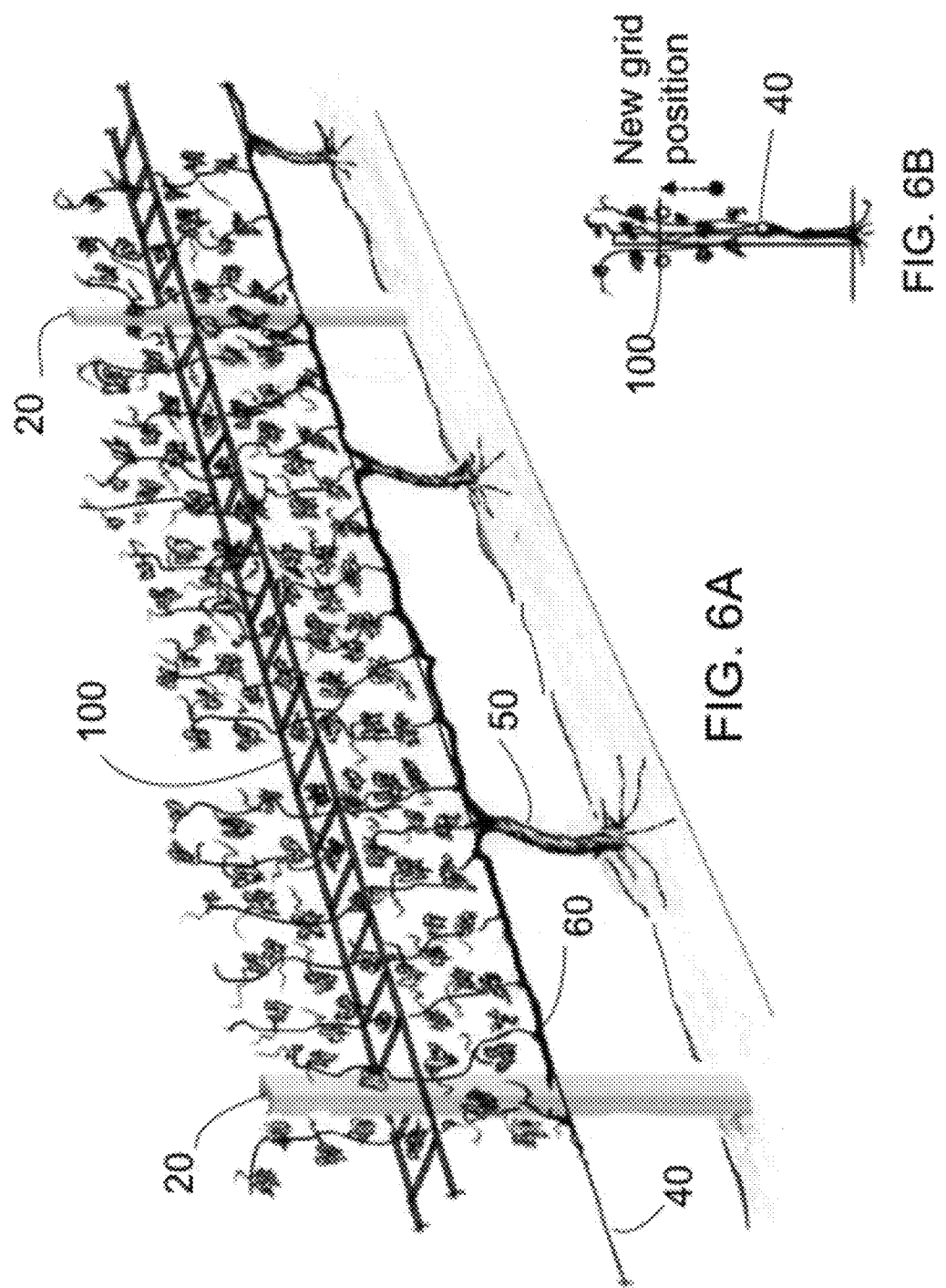

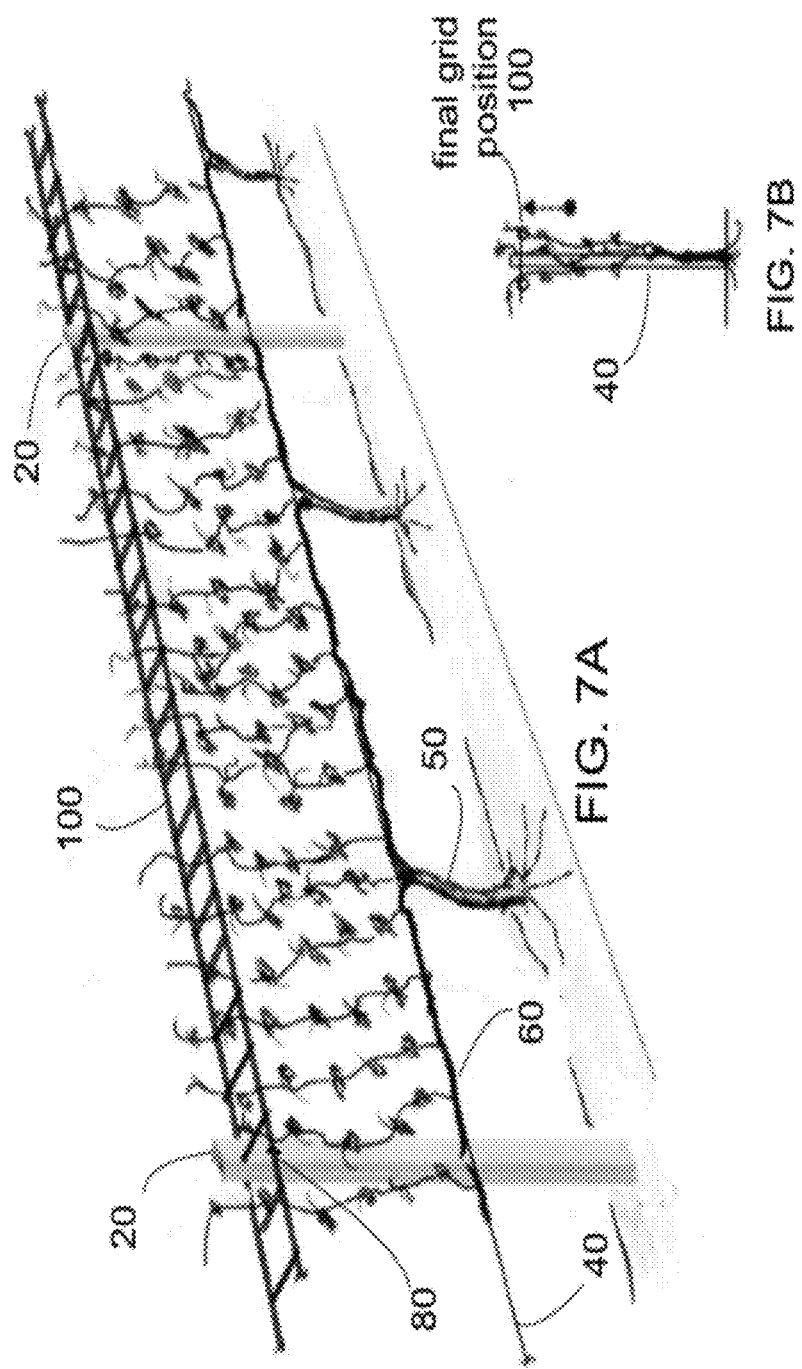

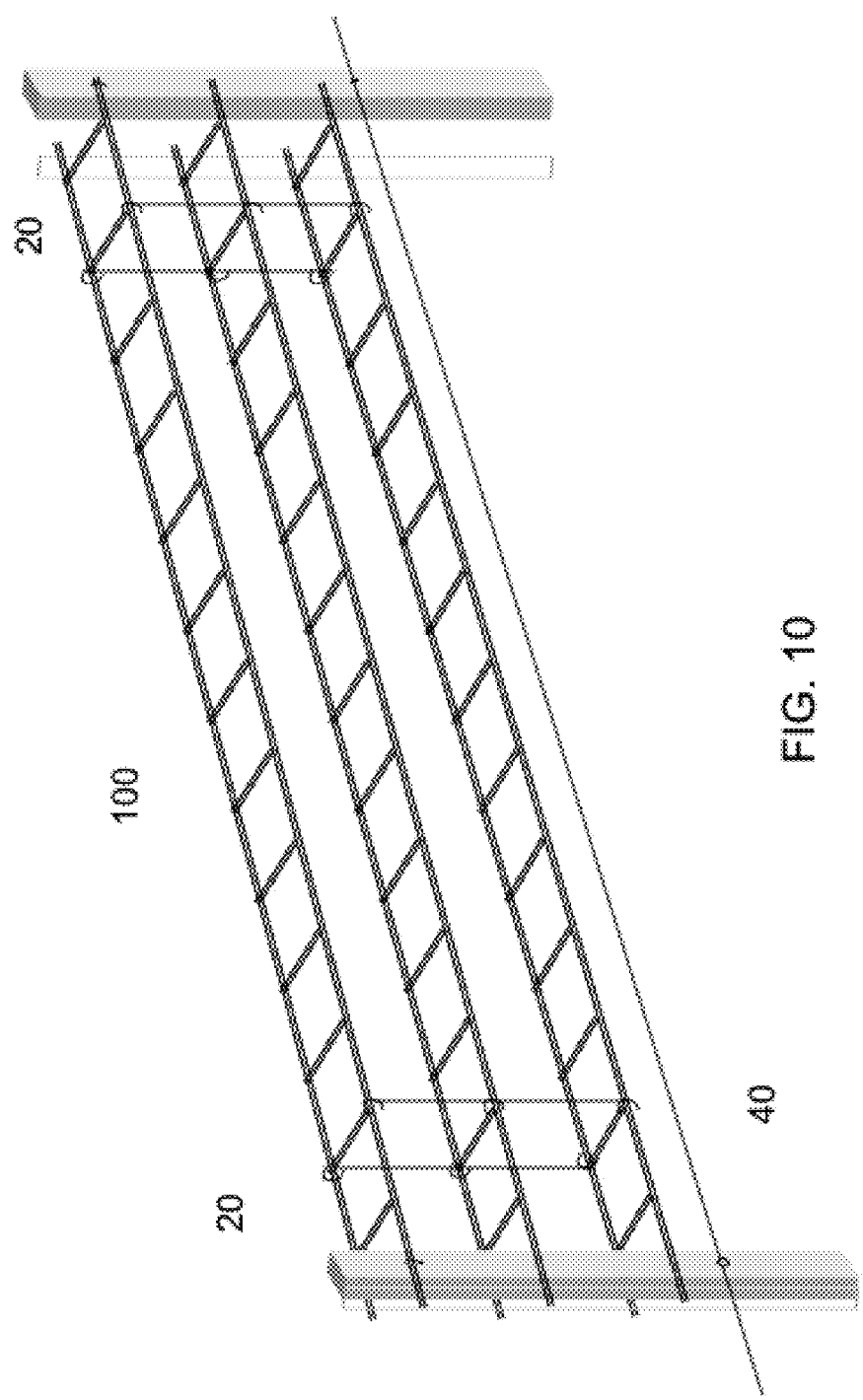

PLAN VIEW

PLAN VIEW

SECTION VIEW

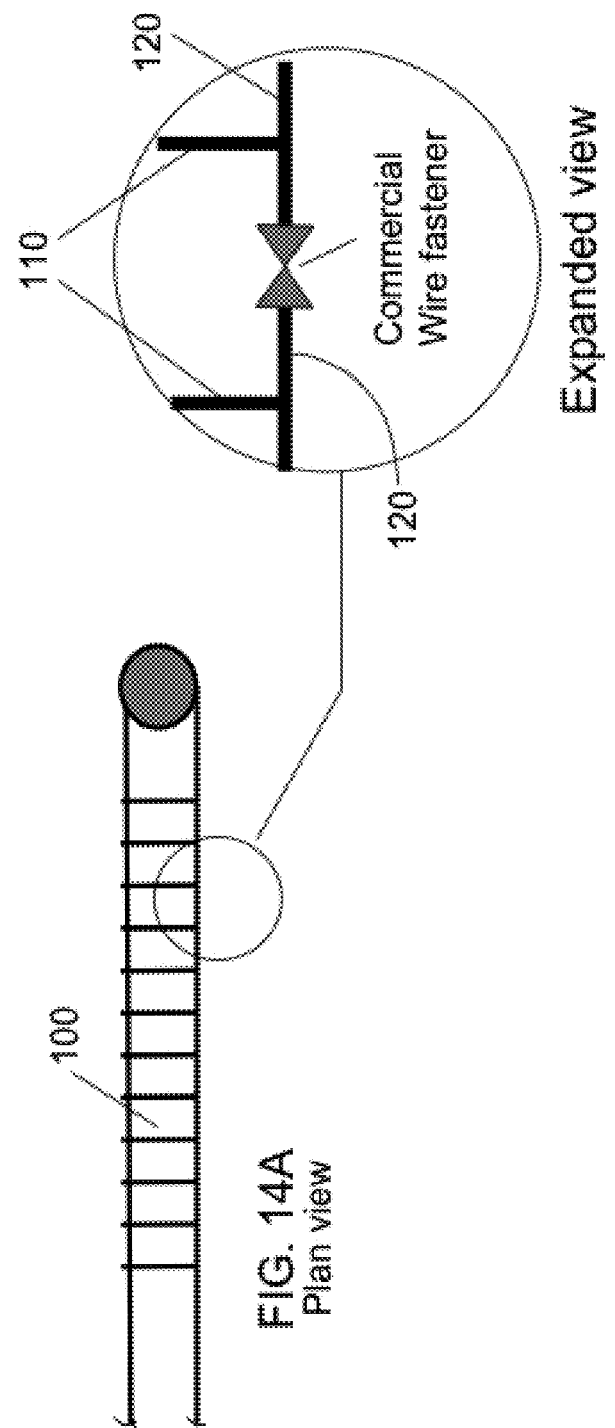

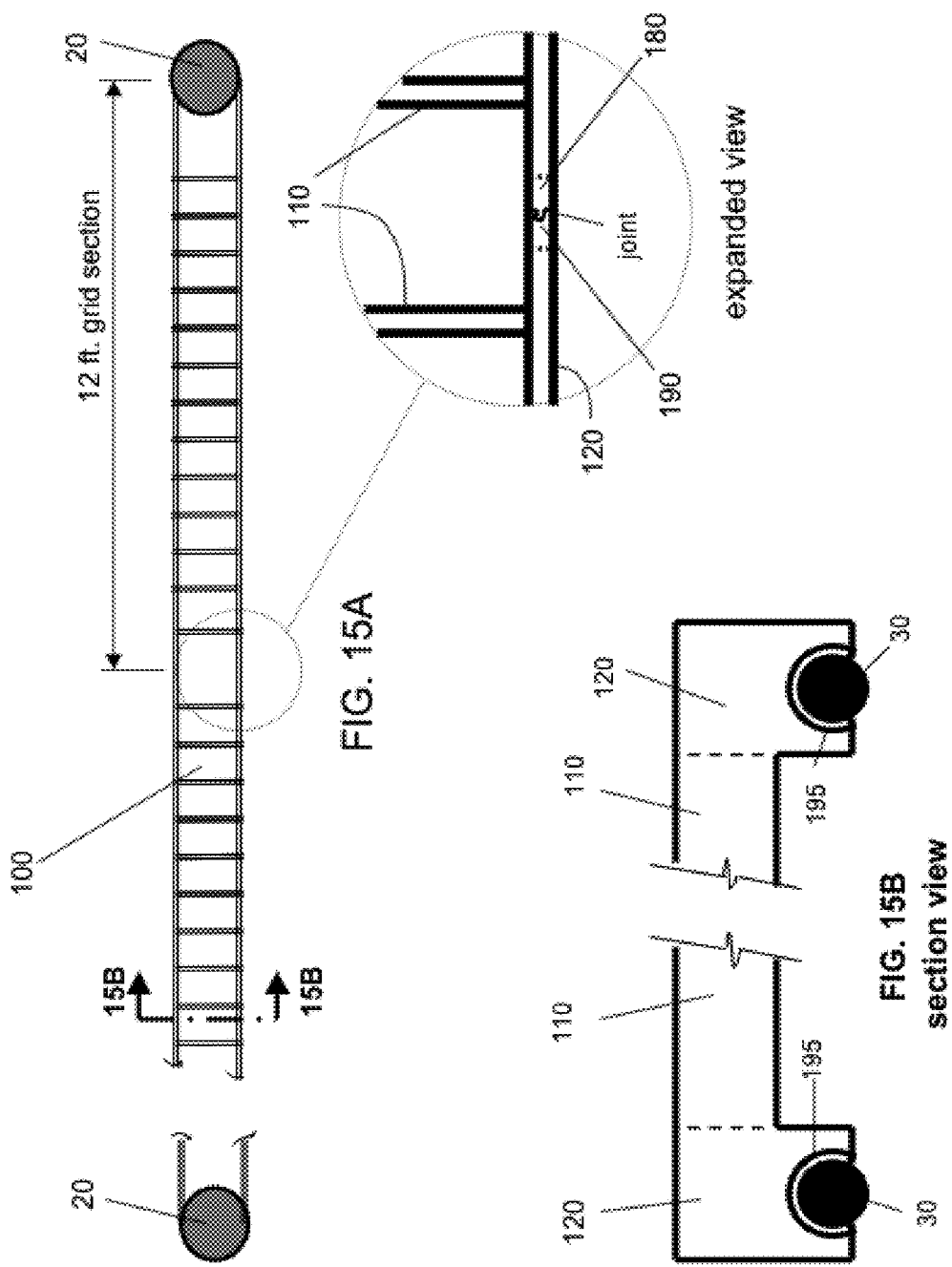

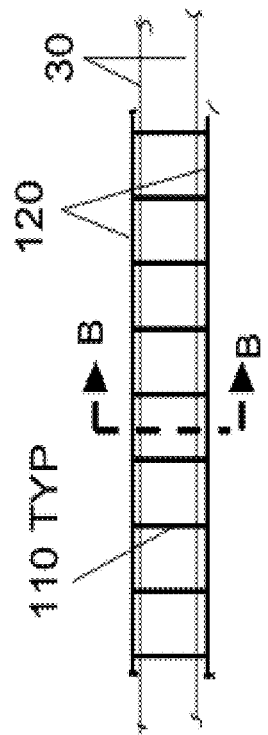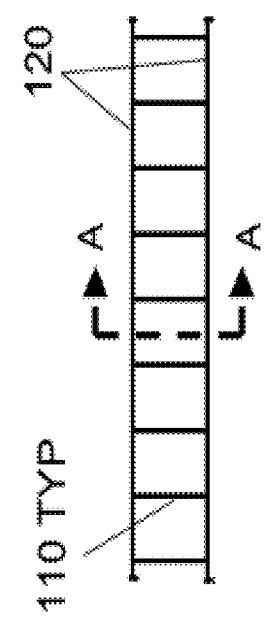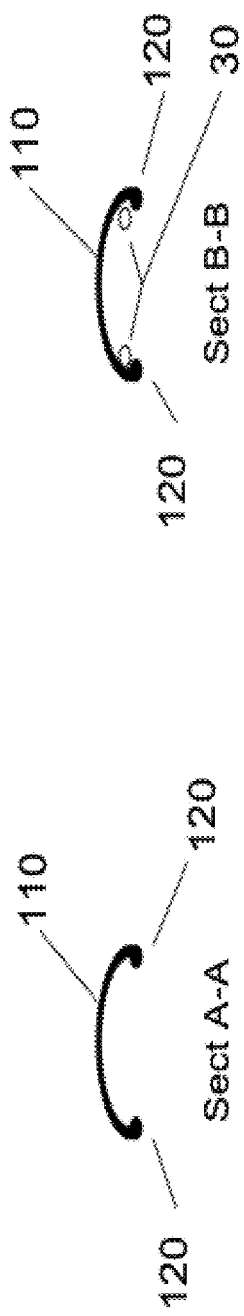
FIG. 16A Plan view
Sect A-A
FIG. 16B Plan view
Sect B-B

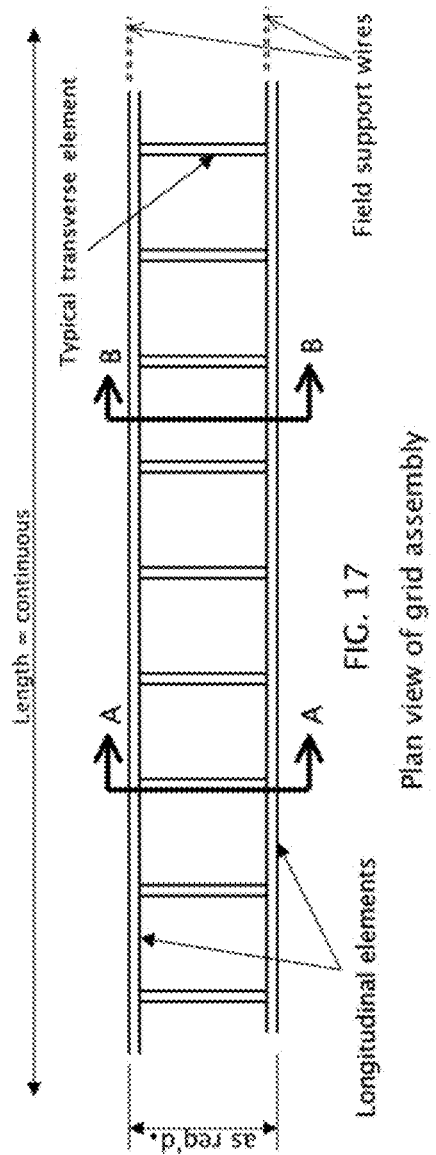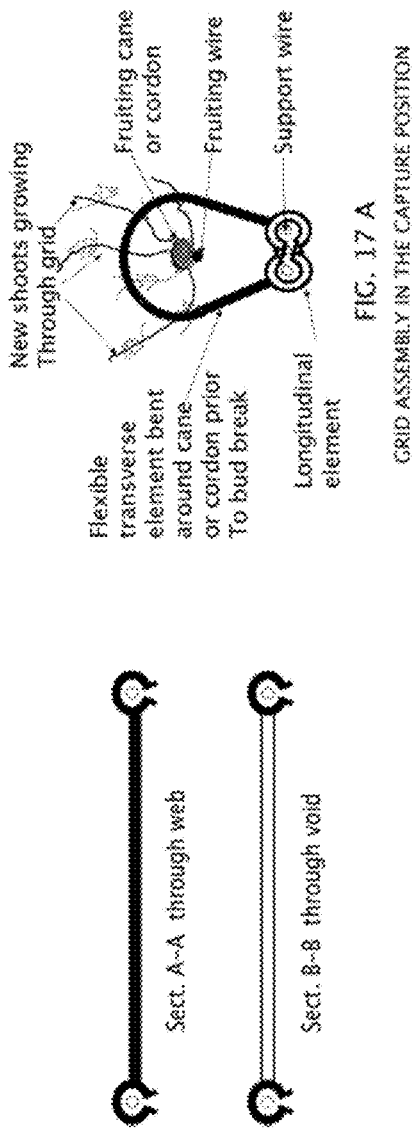

Grid assembly in horizontal position

CAPTURE POSITION OF GRID ASSEMBLY

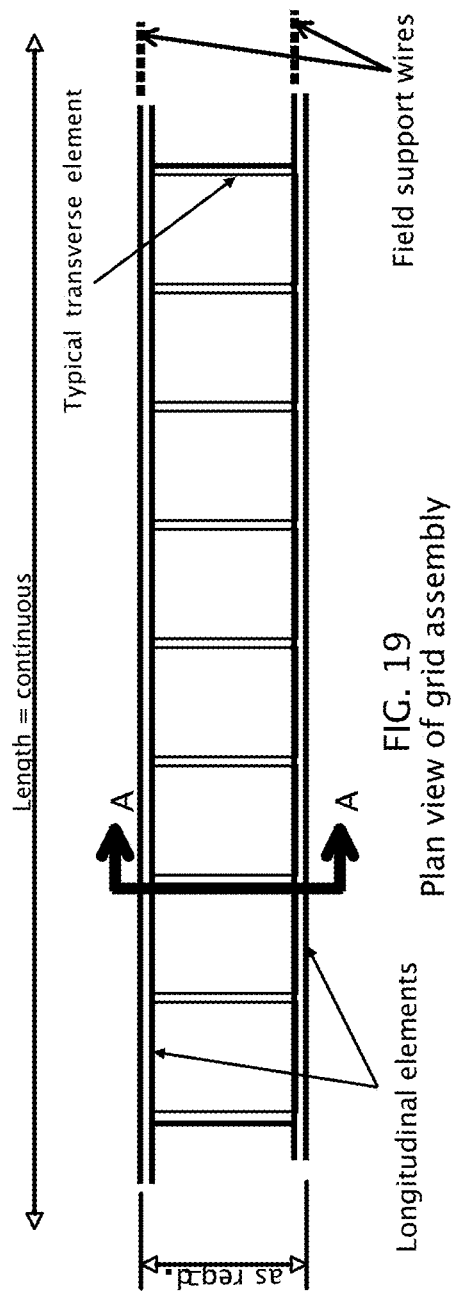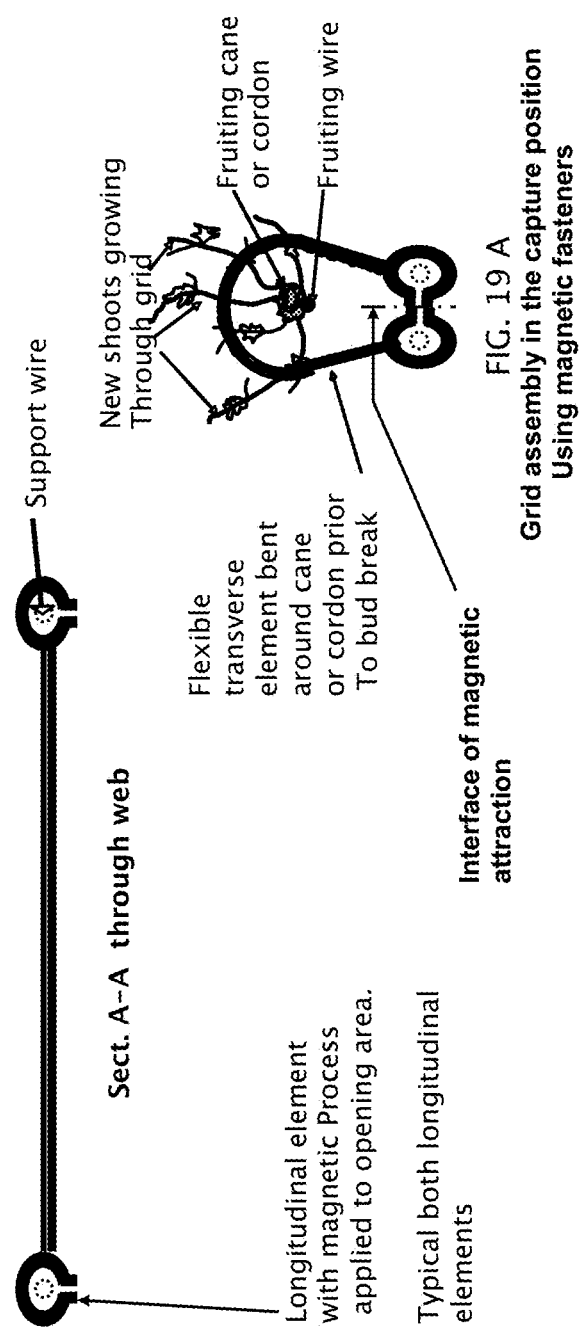

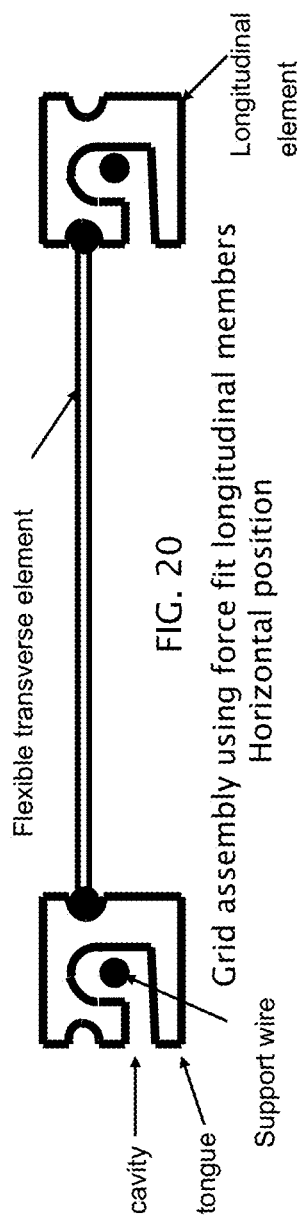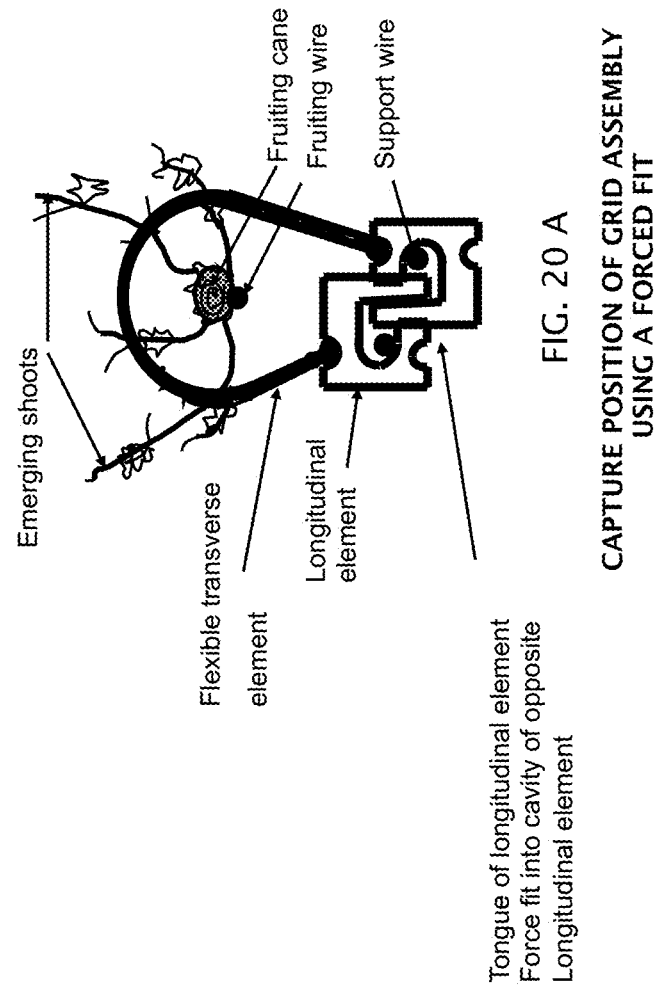

GRID SHOOT POSITIONING SYSTEM FOR GRAPE VINES

CROSS REFERENCE TO RELATED APPLICATION

This application is a (divisional) continuation of U.S. patent application Ser. No. 14/630,225, filed Feb. 24, 2015, which claims the benefit of U.S. Provisional Application No. 61/971,339, filed Mar. 27, 2014.

FEDERALLY SPONSORED RESEARCH

N/A

FIELD OF THE INVENTION

This invention relates to apparatus and methods for training grape vines.

GLOSSARY OF TERMS USED

Bud—An undeveloped shoot. Usually consists of rudimentary leaves and flower clusters.

Cane—A mature, woody shoot after leaf fall. A source of buds.

Canopy—The above ground parts of a grapevine.

Catch wire—A wire that serves to guide developing grapevine shoots. It can be moveable or fixed and there may be one or a plurality of wires that act as a system. When the novel VLSP grid is attached to an existing catch wire the catch wire becomes a support wire for the grid.

Cordon—An extension of a grapevine trunk with a specific orientation. Cordons are perennial wood and carry fruiting spurs that are renewed annually. A source of buds.

"Cordon or cane"—the parts of the grape vine that are attached to the fruiting wire and provide shoots for training. When these terms are used together it indicates that the grower has chosen to use one or the other and that the terms are interchangeable with respect to how they interact with the novel VLSP growing system.

First elongated element—transverse element (used interchangeably)

Fruiting wire—A wire, usually horizontal, and attached to posts. It serves to support canes and cordons within the fruiting zone.

Grid—An apparatus used to train vines by the novel VLSP method. It consists of longitudinal and transverse elements configured to provide openings for foliage to grow through.

Lateral—Indicates a sideways direction with respect to a known axis. When used with respect to a grapevine canopy it indicates the side to side direction along the longest direction of the canopy.

Lateral support—When used in reference to a grapevine canopy it keeps the foliage from falling, slipping, or sinking in a sideways direction.

Longitudinal element—an element substantially parallel to a fruiting wire.

Second elongated element—longitudinal element (used interchangeably)

Shoot—Current seasons stem growth arising from a bud, including the stem, leaves and fruit.

Spur—A short cane that has been pruned to one to four nodes.

Support wire—A wire that serves to give structural support to another member, such as a grid element.

Tendril—A slender vine growth arising from shoots. It can coil around objects and help support the shoot.

Transverse element—an element connecting a plurality of longitudinal elements.

Trellis clip—A commercially available device that attaches to the wires of a trellis system. It is used to temporarily fix a set of catch wires into a pre-determined spacing and help to prevent movement of the foliage.

VLSP—Vertical and Lateral Shoot Positioning system. A novel vine training method and apparatus, described below in the Detailed Description of the Invention section.

VSP—Vertical Shoot Positioning system. A conventional training technique that places the shoots of a vine into a vertical position perpendicular to the ground.

BACKGROUND

A common problem with grape vines is how to train vines to prevent overlapping foliage in order to allow sufficient sun exposure. It is well known that shading has adverse effects on fruit quality. When their leaves are shaded, grape vines suffer from higher acidity, impaired color, and lower soluble solids and phenolic content.

To illustrate the limitations of current growing methods, a conventional grape vineyard training system known as the Vertical Shoot Positioning (VSP) system will be described in this section.

In order to increase exposure to the sun's rays, vines are commonly attached to a framework called a trellis. A new growth is called a shoot and collectively, all the shoots comprise the canopy. The canopy is held in position using high tensile wire attached to posts.

FIG. 1A shows a typical Vertical Shoot Positioned canopy attached to trellis 10. Of all the variations of trellis systems the "Vertical Shoot Positioned" system is one of the most common for high quality wine grapes. The leaves of the shoots have been omitted for clarity. The vine trunks 50 are trained to terminate at the lowest wire called the fruiting wire 40. From that point, extensions of the trunk called either cordons or canes 60 are tied to the fruiting wire. New seasonal growth emerges from these cordons or canes. This growth is called a shoot 70. As these new shoots grow they follow random paths searching and competing for sunlight. In an attempt to keep the shoots from shading each other and from shading the emerging grape clusters the grower positions each shoot within catch wires 30 and enables it to grow vertically upwards. Keeping the shoots separated from each other and within their own space within the catch wires is the goal.

In FIG. 1A the vine shoots 70 have been positioned inside the catch wires 30 but can still lean along the axial direction of the fruiting wire resulting in leaf on leaf shading and crowding. The figure illustrates shoots bunching together along the catch wires and near the posts. This causes a shading problem.

There are a limited number of ways that the shoots are initially positioned within the catch wires. Positioning each shoot by hand, one at a time, is common practice. With tens of thousands of shoots per acre this is very slow and time consuming.

Another way to position the shoots is by using movable catch wires. This method is faster than hand positioning but still allows the shoots to move along the fruiting wire axial direction within the confines of the catch wires after positioning takes place. Catch wires 30 can be removed and replaced on the posts 20 through the use of post clips 80.

Although the current systems have many advantages over non-positioned vines they also have several inherent disadvantages. First, existing shoot-positioning methods are very labor intensive. After the initial positioning of the shoots one or two additional passes are usually required to keep the shoots separated and reinserted between the catch wires.

Furthermore, environmental conditions such as wind move the shoots in the fruiting wire axial direction within the catch wires resulting in a non-uniform distribution of shoots along the trellis. This results in congested areas of foliage that shade each other and lower the overall quality of the canopy. Remedial measures to correct this problem are commonly made by using trellis clips that pinch the catch wires together at one or more locations between posts. This prevents the shoots from moving sideways but contribute to additional bunching and shading of the shoots.

Another problem with conventional systems is that some shoots move within the catch wires 30 enough to escape the confines of the catch wires resulting in additional labor to reposition the foliage by hand.

On a smaller scale, there are commercial grid products designed for supporting flowers or small plants, and cannabis. The flower and small plant products are round or have length to width ratios limited to about three to one, whereas grapevine trellises are highly linear and can extend hundreds of lineal feet or as required to form an extended grapevine canopy. Garden grow thru grids are made with fixed legs or fixed height restrictions and so cannot be adjusted to the dynamic growth habits of grape vines. The plant height and growth they are designed for are an order of magnitude smaller than that required for vineyards. They are limited to collecting plant shoots in the upward vertical direction only whereas grape shoots start budding several feet off the ground on a fruiting wire, and can be trained in any direction, including upward, downward and diagonally. Further, they cannot be used on a trellis system such as a grape trellis or be used in a mobile fashion to spread and hold foliage apart in order to achieve more plant sunlight exposure.

The other kind of available grid-based system is used for cannabis training. A system of strings or wires are used to form a grid configuration that is randomly configured in size and is used to hold down foliage branches so as to force the plants to grow sideways. Such configuration is not mobile throughout the range of shoot growth but is made to bear downward on foliage and suppress upward growth. This system has eventual growth of buds upward through the grid openings but this is an inconvenience of the system as the buds are then necessarily cut away and separated from the grid at harvest. The grid is discarded.

These limitations demonstrate that flower and cannabis support systems are inappropriate for training grape vines, and, as shown above, conventional grape vine training systems are not effective in preventing foliage shading. These problems are overcome by a new proposed training system described in the following sections. When the new method is applied to trellised grape vines, it is preferably referred to as the Vertical and Lateral Shoot Positioning (or VLSP) system.

BRIEF SUMMARY OF THE INVENTION

A novel method and apparatus is described for training grape vines and vine shoots. It uses a fabricated apparatus to train and fix the shoots in place whereby the vine parts can attract maximum sunlight and require less labor to train and maintain the position of the vines.

The improvements and the method of using this new concept are explained in the DETAILED DESCRIPTION OF THE INVENTION section.

BRIEF DESCRIPTION OF THE DRAWINGS

FIGS. 2A through 7B show an embodiment of the proposed training system through one yearly cycle of VLSP training. Since this invention addresses how vines are trained and positioned throughout their entire growing cycle, FIGS. 2A through 7B are arranged in sequence, chronologically, to show how the vines and the invention relate to each other at various growth stages.

FIG. 2A is a perspective view of the proposed VLSP training system prior to spring growth. This is a dormant period and the drawing shows the position of the VLSP grid and how the vine is attached to the fruiting wire.

FIG. 2B is the end view corresponding to FIG. 2A.

FIG. 3A is a perspective view of the proposed VLSP training system. It shows how the grid is lowered over the fruiting wire before a vine begins its annual growth cycle.

FIG. 3B is the end view corresponding to FIG. 3A.

FIG. 4A is a perspective view of the proposed VLSP training system after new growth has begun. It shows how the new shoots rise through the grid as the plant grows.

FIG. 4B is the end view corresponding to FIG. 4A.

FIG. 5A is a perspective view of the proposed VLSP training system showing how the grid is raised as vine growth progresses.

FIG. 5B is the end view corresponding to FIG. 5A.

FIG. 6A is a perspective view of the proposed VLSP training system as the shoots reach full height. The grid has been moved upward to correspond with the new shoot growth.

FIG. 6B is the end view corresponding to FIG. 6A.

FIG. 7A is a perspective view of the proposed VLSP training system showing the grid position after the growing season and in place prior to winter pruning.

FIG. 7B is the end view corresponding to FIG. 7A.

This completes one yearly cycle of VLSP training. The trellis configuration now corresponds to FIG. 2A and is ready for a new years growth.

Figure 9B:
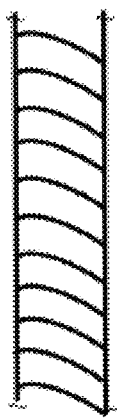
Figure 9D:
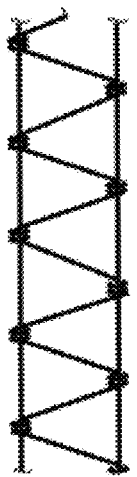
Figure 9F:
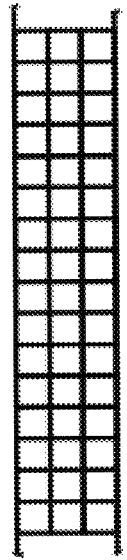
Figure 9A:
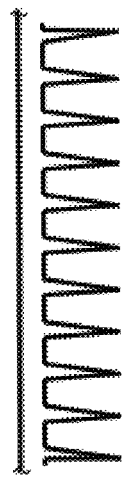

Additional figures are as follows:

FIG. 9A is a depiction of a comb shaped grid used vertically when training vines and vine shoots growing in proximity to the ground.

FIG. 9B illustrates a grid with curved transverse elements.

Figure 9C:
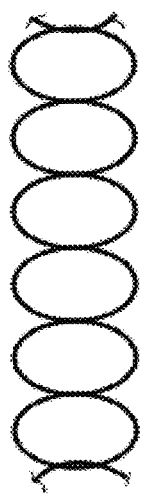

FIG. 9C is a depiction of a concatenated sequence of loops joined so as to create a grid. This can be viewed as two longitudinal elements with repeated pattern, connected at their cusps by transverse elements.

FIG. 9D shows a grid created by two longitudinal elements connected by a third repeatedly crossing transverse element. This may be viewed as two longitudinal elements connected by a plurality of oblique transverse elements.

Figure 9E:
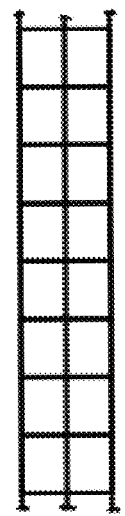

FIG. 9E depicts a grid with three longitudinal elements.

FIG. 9F illustrates a grid with four longitudinal elements.

FIG. 10 shows a three-dimensional grid constructed of interconnected multiple grids.

Figure 11B:
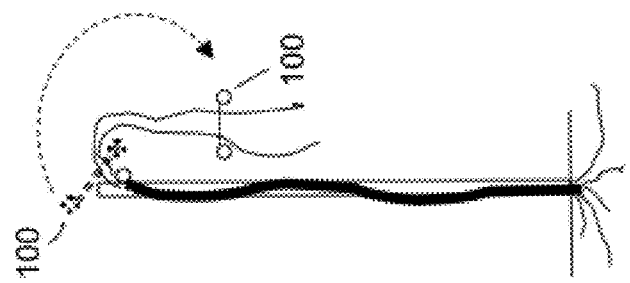
Figure 11A:
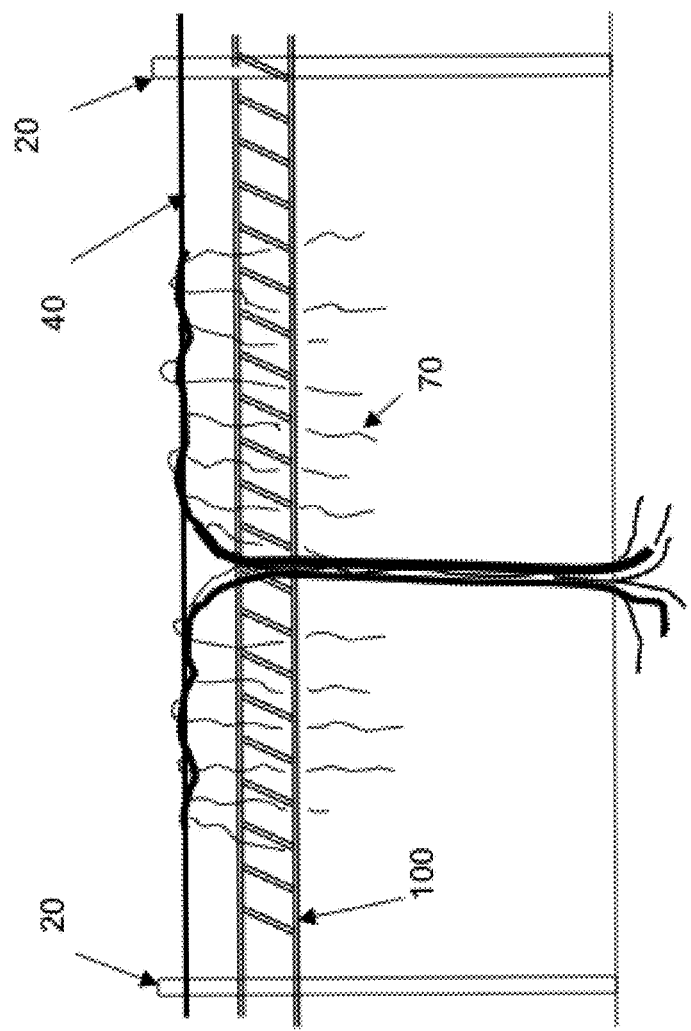

FIG. 11A is a perspective view of the High Cordon system incorporating the VLSP concept in the downward growth direction.

FIG. 11B is the end view corresponding to FIG. 11A, and illustrates a rotative and descending repositioning of the grid as shoots grow.

Figure 12:
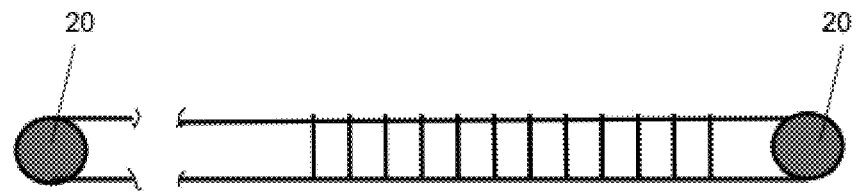

FIG. 12 is a plan view that depicts a grid whose longitudinal elements extend to supporting posts 20.

Figure 13A:
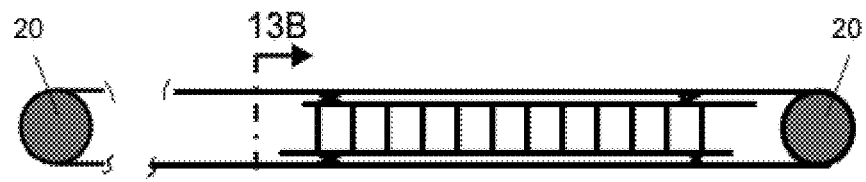

FIG. 13A illustrates a plan view of a grid attached to support wires, such as catch wires, that extend from support posts.

Figure 13B:
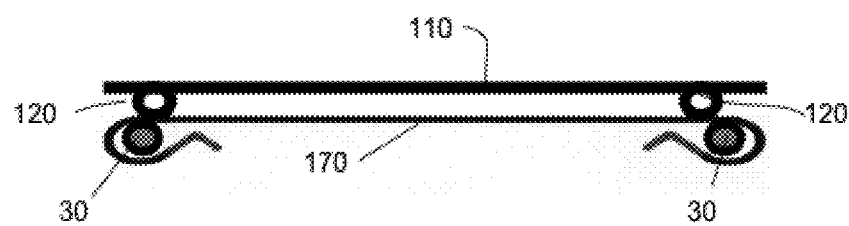

FIG. 13B is a sectional view of a wire grid attached to a pair of catch wires by means of a grid clip.

FIG. 14A is an embodiment in which two lengths of wire grid are joined end to end to effectively extend its length. FIG. 14A inset shows an example of a commercial wire fastener being used to connect the longitudinal elements of two grid sections.

FIG. 15A is a plan view of a grid constructed of a synthetic material, and an inset illustrating an embodiment of how such grids are adjoined.

FIG. 15B is a sectional view of a synthetic grid, showing an embodiment of how this type of grid is fixed onto a set of existing catch wires 30.

FIG. 16A is a plan view of a grid designed to have its transverse elements configured into a curved shape. Sect. A-A is a section view of the curved grid shown in FIG. 16A.

FIG. 16B is a grid similar to that in FIG. 16A but used in combination with a set of catch or support wires 30. Sect. B-B is a section view of the curved grid and support wire combination shown in FIG. 16B.

FIG. 17 is a plan view of a grid assembly in which a grid is loosely attached to a set of catch or support wires. Includes two sections.

FIG. 17A illustrates an end view of an embodiment of the grid assembly of FIG. 17 in a shoot capturing position.

Figure 18:
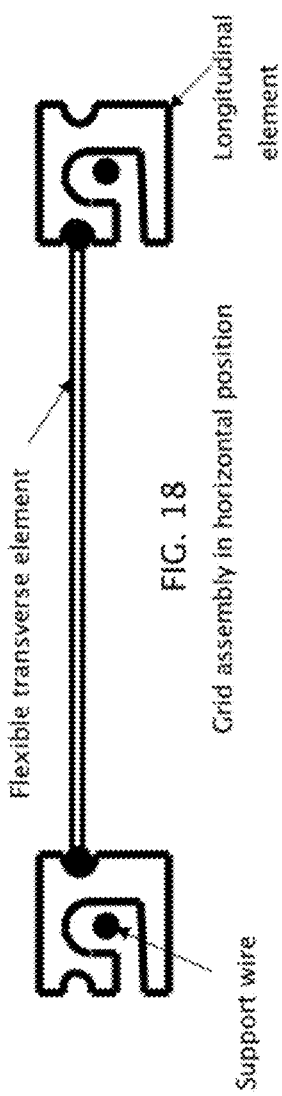

FIG. 18 shows an end view of an embodiment of two longitudinal elements in the form of modular rails that associate with catch wires, and a flexible transverse element that attaches to the modular rails.

Figure 18A:
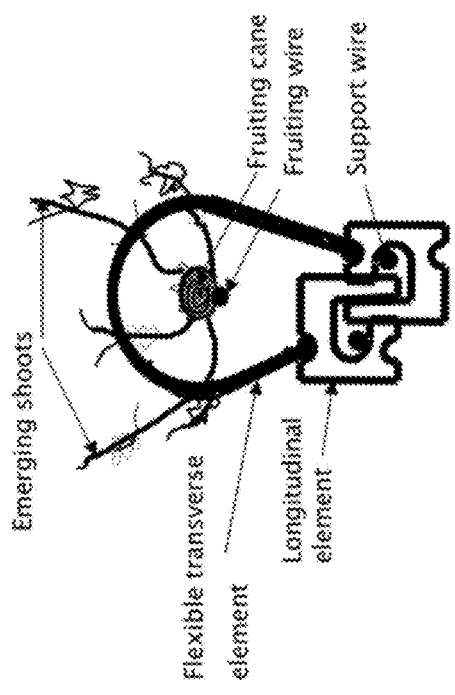

FIG. 18A shows an end view, in detail, of the grid assembly of FIG. 18 now in a shoot capturing position.

FIG. 19 is a plan view of a grid assembly. Section A-A is a section through the web.

FIG. 19A shows a flexible grid bent around cane or cordon prior to bud break, and new shoots growing through the grid. The longitudinal elements are attached using magnetic fasteners based on magnetic attraction.

FIG. 20 shows a grid assembly in horizontal position using a force fit of longitudinal elements.

FIG. 20A shows the grid in a capture position using a forced fit in which the tongue of a longitudinal element is forced into a cavity in the opposite longitudinal element.

DETAILED DESCRIPTION

In order to provide a clear comparison between the prior art and the method of this invention, the example of a vertical shoot position training system will be continued, only in this section the new inventive methodology will be applied and the resulting benefits will be evident. When the new method is applied to training grape vines it is preferably referred to as the Vertical and Lateral Shoot Positioning (or VLSP) system. In the drawings, the same reference numerals indicate like elements throughout the several figures, as follows:

10 Canopy
20 Post
30 Catch wire
40 Fruiting wire
50 Grape vine trunk
60 Cordon or cane
70 Shoots
80 Post clip
100 Grid
110 Transverse element of grid
120 Longitudinal element of grid
170 Grid clip
180 End joint (male)
190 End joint (female)
195 Grid socket for catch wire The VLSP shoot positioning system is a concept that improves both quality and production costs over the existing methods because it provides lateral support to vine shoots 70 as opposed to the prior art of only providing vertical support. In addition, it fixes the vine shoot in an optimum location within the trellis for the life of the growing cycle, which eliminates the need to reposition shoots as the season progresses. Because the grapevine canopy will now have its shoots evenly distributed and fixed in place it increases the vines' ability to produce higher levels of quality fruit.

Although some embodiments are described in conjunction with training vines and shoots in a grape vineyard, the embodiments are applicable to many other vine and vine shoot training systems.

The Grid

The grid is the physical object that makes the VLSP concept possible and is configured to provide a barrier between foliage shoots 70 as they grow.

The term "grid" defines an overall structure that is comprised of a plurality of geometrically configured parts that are arranged to be placed in close proximity to a living vine and is used to control the direction of foliage growth. The grid is configured and sized to separate shoots in a vineyard in order to reduce foliage overlap.

Referring to FIG. 2A, the use of the word "grid" in this description includes but is not limited to a plurality of transverse elements 110 connected to one or more longitudinal elements 120.

Grid as Matrix of Openings

Referring now to FIG. 9A-F, a grid may be viewed as a matrix or array of openings or spaces. The terms matrix and array are used interchangeably, and the terms opening and space are used interchangeably in this description. For example, the grid of FIG. 9E may be viewed as a matrix of 16 openings associated with and separated by transverse and longitudinal elements. The matrix of openings is a linear array which is substantially longer than wide, usually be a factor of at least nine to one (length to width).

The purpose of the grid and its associated array of openings is to capture and train individual shoots, as shown in FIG. 4A, for example. Although the grid openings need not be spaced exactly in accordance with the spacing of the shoots, nonetheless it is preferred to bear in mind the grapevines' growth and culture requirements. In an embodiment, grids have openings that match the ideal shoot spacing required for a given variety and distribute that spacing along the fruiting wire providing a barrier between shoots. For example, *vitis vinifera,* the most common wine grape type, includes such cultivars as Chardonnay, Cabernet Sauvignon, and Pinot Noir and their ideal shoot spacing is from 4 to 6 shoots per lineal foot of trellis. Accordingly, the corresponding grid can be made to provide 4 to 6 openings per lineal foot. On other varieties, such as many hybrid varieties, the shoot spacing is recommended to be closer, ideally between 6 to 10 shoots per lineal foot and the grid can be configured to match that recommendation. A good compromise setting is about 6 openings per linear foot. For vines other than grapevines the grid openings are spaced relative to the growth pattern of that type of vine.

One embodiment doubles the number of openings per lineal foot in the grid pattern with respect to the ideal shoot spacing for a given variety. For example, rather than use 6 openings per lineal foot, the corresponding grid may be made to provide 12 openings per lineal foot to tighten control of each shoot and to leave an empty opening between shoots for better protection against foliage shading. In this way the shoots will on average be more consistently separated for better avoidance of shading because of the empty grid openings between shoots. Such separation may also be achieved by multiple longitudinal rows of openings as shown in FIGS. 9E and 9F. In general it is desirable to provide at least one opening per shoot. It is not desirable to have more shoots than openings.

For manufacturing purposes a small number, such as two or three, of grid sizes can be made and these would approximately satisfy the grid requirements for vines of different kinds, even though it may not be the ideal spacing for every kind of vine, yet still function adequately. Grids can also be made with irregular spacing of the transverse grid elements, although this may be less desirable from a manufacturing viewpoint.

The intention is to capture as many shoots in the grid as possible even though a few may escape due to the unpredictable nature of vine growth. There may also be cases in which a plurality of shoots will occur in one grid opening but the goal is to have each shoot in its own grid opening. Manual repositioning of the shoots will help correct such problems.

In special situations, such as growing vines in very hot climates, some shading of fruit may be desirable. Using the VLSP method, the shading can be more precisely controlled. More accurate growth direction may be encouraged resulting in fruit shading but not leaf shading. Thus, in any situation, the VLSP method provides another tool for vineyard management.

Grid as Interconnection of Transverse and Longitudinal Elements

As mentioned, the use of the word "grid" in this description includes but is not limited to a plurality of transverse elements 110 connected to one or more longitudinal elements 120. Transverse elements are also referred to as first elongated elements and the terms are used interchangeably; longitudinal elements are also referred to as second elongated elements and the terms are used interchangeably. Transverse elements need not be perpendicular to longitudinal elements. Transverse elements need not be parallel to other transverse elements. Generally the grid of interest is a linear grid, meaning a grid substantially longer than wide, usually by a factor of at least nine to one (length to width).

Grids may be made of flexible or rigid material. Since the grid's function is to separate shoots, it may have any of a variety of shapes including ladder-shaped grids as illustrated in FIG. 2A as well as comb-shaped grids shown in FIG. 9A. The latter is a depiction of a comb shaped grid for use when training vines and vine shoots growing in proximity to the ground. The teeth of the combs correspond to transverse elements, and the back of the comb to a longitudinal element.

The transverse elements need not be in the shape of straight lines. They may be curved as exampled in FIGS. 9B and 9C, or formed as part of a continuous line as in FIG. 9D.

FIG. 9C is a depiction of a concatenated sequence of loops joined so as to create a grid. FIG. 9C can be viewed as two patterned longitudinal elements (the upper and lower parts of the loops), connected by transverse elements joining the upper and lower longitudinal elements at their cusps.

FIG. 9D shows a grid created by two longitudinal elements connected by a third element crossing back and forth between the two longitudinal elements. For the purposes of this specification, however, it is equally valid to view this grid as two longitudinal elements connected by a plurality of sloping transverse elements.

FIGS. 9E and 9F illustrate grids with more than two longitudinal elements.

FIG. 10 shows a three dimensional grid constructed of interconnected multiple grids. As with FIGS. 2A through 9F, FIG. 10 may be rigid or flexible or both. As an example of the last, the three grid sections of FIG. 10 may each be rigid, but the lines connecting them may be flexible. For example, in an embodiment of the VLSP system, the three grid sections may be collapsed on top of one another before the shoots begin to grow. As the shoots grow, the top grid is adjusted upward, automatically pulling the second grid section up into active use. As the shoots grow even higher, the top grid may be adjusted upward again, pulling the second grid section higher and the bottom grid section up into active use.

The grid can be prefabricated or fabricated at the site of use.

The grid can be made of a metallic substance such as, but not limited to, steel, copper, aluminum, silver, iron, or any other of the elemental metallic or alloy substances. The grid can be made of a synthetic compound such as, but not limited to, nylon, acrylic, polyester, carbon fibers, polycarbonates, or any other combination of synthetic or synthetic and natural substances. The grid can be made of any animal, vegetable or mineral natural material. The grid can be made of any regenerated, recycled, semi synthetic, synthetic, mineral, polymer, natural or man-made compound. The grid can be made from a flexible, semi flexible or rigid material. It can be of fixed dimensions or have the capability of stretching or compressing.

The longitudinal and transverse elements can be attached to each other by many means, such as: welding, adhesion, wrapping, and insertion. Thermal joining such as spot welding is performed based on properties of the material used. Adhesive bonding is another approach. Wrapping is illustrated in FIG. 9D. An insertion technique is shown in FIG. 18 in which transverse elements are inserted and captured in a longitudinal element. These examples of grid assemblage are shown to illustrate the range of possibilities and are not meant to be limiting.

The width of the grid is measured in a perpendicular direction from the long axis and is measured horizontally with respect to the position of function. The size of the grid will vary according to the intended grape vine usage and preferably will vary in overall width from 1 inch to 48 inches. For specialty crop use, the width can be less than 1 inch and can exceed 48 inches as required for the application.

The length of the fabricated or pre-fabricated grid is measured along the long axis when in the normal position of function. In the case of trellised grape vines this dimension is parallel to the long axis of the trellis. The preferred fabricated length can be from 1 inch long to an unspecified length, which is limited by the manufacturing and logistic conditions and is cut to fit specific field conditions.

The thickness of the grid material is preferably from 1/64 inch to 1 1/2 inches depending on application requirements, but can be smaller or larger if desired.

The geometric shape of the grid components, which together make up the assembly in whole, can be triangular, rectangular, square, polygons with any number of sides, circular, oval, curved, annulus, crescent, elliptical, segments and sectors of shapes, or any combination of the above. The cross section of the longitudinal and transverse elements may be different, and may be of any shape such as triangular, rectangular, square, polygonal of any number of sides, circular, oval, curved, annulus, crescent, elliptical, segments and sector of shapes, or any combination of the above.

FIGS. 2A through 7B illustrate a flat grid but the transverse elements may also be elastic. For example, the grid can be sufficiently flexible to, before growing season, bend, curve over, drape over a cordon or cane, as in FIG. 16A, or even be wrapped around a cordon or cane to enclose and capture all the desired budding shoots, as in FIGS. 17A and 18A. When lowered into position, it encircles the newly emerging shoots capturing them within the openings of the grid. Capturing new shoot growth is the basic function of the VLSP grid system at this growth stage. This arrangement helps capture all the emerging shoots by the grid.

The grid may be any color, can be coated with any material that enhances the performance such as Teflon, rust proofing, galvanization, paint or similar coatings.

The grid can be shortened or lengthened as desired to fit any desired length. The inset in FIG. 14A illustrates the use of a commercial wire fastener to increase the length of a wire grid. FIG. 15A and its inset show an embodiment to extend or connect grids that are made of plastic or other synthetic material. In both examples two lengths of grid are joined end to end. Any method of attaching two grids together to create a longer grid may be used, and are not limited to the examples illustrated.

Another factor of the VLSP grid is the overall flex and strength characteristics that are addressed when designing the specific system for use. In some embodiments the VLSP grid is made to move upward in one motion between the support posts and can be designed, for instance, to have the specific rigidity, anti friction qualities (smooth surfaces) and sizing of the openings to make the motion smooth and efficient and help to overcome resistance from foliage and tendrils.

Grid System

The grid can be used independently without an accompanying structure or may be applied to a trellis system or other structure. It can be supported or unsupported while in use and can be supported entirely by the foliage. The grid can be used as a singular device, or coupled with multiple other grids to form a grid complex intended to carry out the training of grape vines. A grid complex can be configured in size, shape, and uses according to the foliage training requirements. It can be used in a vertical direction upwards, downwards, horizontally, or at any angle required to train the foliage. This is illustrated in FIG. 11B wherein the grid is employed in a downward training mode. When a grid is used together with other grids, the combination can have the ability to be stacked together, clipped together, or otherwise joined to form an advantage to the user.

The grid can be moved and relocated on the trellis or bare foliage as often as the user deems necessary. The number of moves required to complete the objective is entirely up to the user and is understood as being part of the intended use of the grid. Typically two moves are satisfactory, and sometimes one move is sufficient to properly retrain the vine.

In the case of a standalone embodiment, the grid may be placed on a plurality of upward growing shoots when enough foliage has grown to support the freestanding grid. The grid will move upward with the growing foliage, providing some degree of separation. In other situations, however, the grid is supported by wires, such as catch wires, posts, or other supports.

FIG. 12 illustrates an embodiment in which the grid is extended and attached to posts for support. The attachment is preferably adjustable so the grid can be repositioned as the vine shoots grow through the season.

FIG. 13A shows another embodiment, in which the grid is attached to separate support wires that in turn adjustably attach to support posts. These separate support wires may be pre-existing catch wires often employed in vineyards.

The grid may be used with any available post size and configuration including wooden posts, metal posts, and posts of a synthetic material. Posts may be square, round, or of any other configuration designed for trellis use. The attachment of the grid or support wires to the post can be by means of standard vineyard commercial post clips, staples, slots in the post, or any other fastening method.

The method of overlaying includes snapping into, tying to, clipping onto, or otherwise attaching to pre-existing catch wires. In this usage the catch wire's function has changed. Conventionally the catch wires are used principally to roughly contain shoots within the space between posts; the VLSP method in this embodiment uses the catch wires as supporting wires for the much more accurate shoot containment using a grid. Grid clips may be stand-alone or an integral part of the grid or catch wire. An example embodiment of this feature is illustrated in FIGS. 13A and B, where a grid clip, which is an integral part of the grid, snaps onto existing catch wires 30. In this example the length of the transverse elements 110 match the spacing of the existing catch wires 30. This allows the grid to be overlaid onto the existing system in the most efficient way. Attachment points between the two systems are then enabled to be coincidental which eliminates the possibility of new and unwanted nooks for the foliage to attach to. In an embodiment, grid clips are fabricated into the grid pattern at, for example, +/−2 foot intervals, and the grid clips match the regular grid pattern and are of the same material and diameter as the grid elements. This is an attractive retrofit because most vineyards already have catch wires installed and thus converting to the proposed system involves minimal expense and labor effort, and provides improved foliage control and reduced overall labor cost already alluded to.

FIG. 13B is a section view of a wire grid 100, attached to catch wires 30. In one embodiment the grid is constructed so that the transverse elements 110 are used in combination with a grid clip 170. The pattern of the transverse elements is uniform and continuous with one grid clip fabricated into the overall pattern at, for example, approximate 24-inch intervals depending on the specific element spacing for the application. The clip acts as a transverse element so as not to interrupt the repeating pattern of the grid configuration. With the grid constructed this way it can be overlaid onto an existing set of catch wires using the catch wires to support the grid. Therefore, the grid clips 170 serve two purposes. They enable the attachment points on the catch wires and also act as a transverse element.

In this example the grid is fabricated with wire components although similar configurations using a synthetic material such as plastic can be used. This latter application is shown in FIGS. 15A and 15B (described below).

FIG. 14A is an example of how two lengths of wire grid can be joined end to end. It also applies to repairs when the grid has been damaged and the wire components need to be re-joined. The method of union enables the use of existing commercially available hardware, if desired. The most common products that would be applicable include but are not limited to most trellis joining methods such as crimping sleeves, wire lock fasteners, wire splicing hardware or any other industry standard proprietary products.

FIG. 15A shows a plan view of a grid 100 constructed of a synthetic material such as plastic. In this embodiment, the sections of the grid are 12 feet in length and are modular in design so that each section can be snapped into an adjoining section, end to end, forming a continuous grid of any suitable length. The end sockets are designed as a male end treatment 180 and a female end treatment 190. The design length of 12 feet is preferred, but not necessary, in order to match the standard 24-foot post spacing used in most commercial vineyards. Thus, two sections of grid can be joined together to complete one post-to-post panel.

FIG. 15B is a sectional view of the synthetic grid 100. It shows how this type of grid can be fixed onto a set of existing catch wires 30. The use of a construction material such as plastic enables the design of an attachment socket that is integrally cast with the grid body. The catch wires snap into the socket 195, which is part of the longitudinal element of the grid. Socket spacing is configured to be nominally 24 inches along the length of the grid.

Various embodiments may be utilized to capture the catch wires in a cavity cast into the grid body, such as use of: an "S" or other intricately shaped cavity that retains wires by requiring complex motion to escape; a force fit in a tight cavity in which considerable force is required to extract the wire; a cavity, such as a conformal cavity, with elastic walls that make exit difficult; and in general any configuration that retains the catch wire once it has been inserted into the cavity or socket. In some embodiments it may be preferred to have a loose fit of the grid cavity onto the catch wires for ease of sliding the grid or grid elements with respect to the catch wires. The clearance is sufficient to allow movement, while the lip or shape that captures the catch wire must encompass the catch wire sufficiently to retain same under normal use.

16A shows a simple grid 100 with transverse 110 and longitudinal 120 elements. The difference in this configuration is that the transverse elements are configured into a curved shape attaching to the longitudinal elements as shown in Section A-A. This provides an additional effective cross sectional area encompassed by the grid section as a whole. The result is that when the grid is lowered into position as shown in FIG. 3B, the transverse element curves over, partially draping the cordon or cane and has an enhanced ability to gather new shoot growth.

Sect. 16B depicts the same grid as Section A-A but the view shows how this configuration can be combined with a set of catch wires 30. Section B-B illustrates how this curved grid traps the catch wires.

FIG. 16A or B is used as a typical example of a grid that is designed to have its cross section occupy more than a single plane. Although the example is a simple grid, the concept can be used with any and all grid configurations.

FIG. 17 is a plan view of a grid loosely attached to a set of catch wires. Section A_A is a section view of the grid through the web (transverse or first element), illustrating a significant clearance between the grid attachment housing and the catch wires. Section B-B is a section view of the grid through the void between the transverse elements. The transverse elements may be straight or curved, rigid or flexible.

FIG. 17A illustrates an end view of an embodiment of the grid assembly of FIG. 17 in a shoot capturing position.

FIG. 18 shows an end view of grid assembly consisting of two longitudinal elements in the form of modular rails that associate with catch wires, and a flexible transverse element that attaches to the modular rails. The rails can be made by extrusion or other process. As mentioned, the cross section of longitudinal elements may be of any shape. The particular shape illustrated is an example of a longitudinal element that accomplishes the following purposes: (a) has a receptacle for the transverse element to securely attach to; (b) has a receptacle for loosely retaining catch wires; (c) uses the same catch wire receptacle to also lock into the longitudinal element at the other end of the transverse element (shown in FIG. 18A). These functions can clearly be accomplished by other means as well.

FIG. 18A shows an end view of a transverse element bent around the fruiting wire and the cordon or cane to capture all growing shoots; the transverse element is attached to modular rails which are locked together along with their captured catch wires. The modular rails are unlocked as the shoots grow.

FIG. 19 is a plan view of a grid assembly. Section A-A is a section through the web.

FIG. 19A shows a flexible grid bent around cane or cordon prior to bud break, and new shoots growing through the grid. The longitudinal elements are attached using magnetic fasteners based on magnetic attraction. Another fastening mechanism is a hooking of longitudinal elements together to form a substantially closed loop.

FIG. 20 shows a grid assembly in horizontal position using a force fit of longitudinal elements.

FIG. 20A shows the grid in a capture position using a forced fit in which the tongue of a longitudinal element is forced into a cavity in the opposite longitudinal element. It requires force to disengage the longitudinal elements.

For more mechanized vineyards, the supporting wires, that is, the wires that support the grid, may be mechanically adjusted, rather than hand-adjusted, by use of pulleys or winches or by tractor mounted implements, or other labor saving means.

Method of Use

FIGS. 2A through 8 illustrate how and when to move and place a prefabricated grid 100 using the VLSP system.

A first embodiment of the VLSP system will now be described and includes references to FIGS. 2A through 7B, which are arranged sequentially to correspond with the natural progression of the growing season. This embodiment illustrates how the concept of VLSP works in the context of vertical positioning of grape vine shoots, and the timing of the various operations.

FIG. 2A illustrates the dormant vine stage, after pruning. In this figure a perspective view of a portion of a trellis 10 is shown. The vines 50 have been pruned to the desired number of buds and the cordons or canes 60 have been secured to the fruiting wire 40 in much the same way as conventional viticulture. Compared to the prior art, in this embodiment no catch wires are required but are replaced by a single shoot positioning grid 100. In this example, the grid continues along the entire length of the vine row. In this stage of growth the grid had been positioned near the top of the posts prior to the previous winters pruning.

As explained earlier, the grid may extend the entire length of the vine row, or may be used in sections supported by wires such as catch wires.

FIG. 2B shows this trellis configuration in end view.

FIG. 3A illustrates the pre-growth stage. This figure depicts the same vines just prior to spring growth. The shoot-positioning grid 100 has been lowered to a position where it rests as close as possible to the cordon or cane 60 and the fruiting wire 40. It is secured to the posts 20 by industry standard post clips 80 that allow future re-positioning of the grid. Preferably the grid is positioned as shown prior to any bud swelling or bud burst, that is, before the appearance of any green tissue. In theory the grid can be applied at the inception of any green tissue, but waiting too long presents the risk that the grid may not capture all the shoots or may damage tender shoots when initially positioned. It is best to position the grid no later than the beginning of spring growth, yet it is ill advised to wait until the first appearance of green tissue. The wisest policy is to position the grid prior to any green tissue.

As noted earlier in the Grid and Grid System sections, and in FIG. 9B, 16A and B and FIGS. 17A and 18A, a curved or, more generally, elastic grid may be used, before growing season, to drape over a cordon or cane, or even wrap around a cordon or cane to better capture all the desired budding shoots. As the shoots grow the grid is unwrapped to assume a more planar shape (but not necessarily flat).

FIG. 3B shows this trellis configuration in end view. The movement of the grid and new position is indicated by the dashed line and arrow.

FIG. 4A depicts early shoot growth, showing how the new spring growth passes upward through the positioning grid 100. The grid remains in the previous location noted in FIG. 3A. Each new shoot 70 finds its own place within the openings of the grid. New growth is allowed to continue in this way until all emerging shoots are confined to spaces within the grid. Growth direction is random but this embodiment of the VLSP system takes advantage of the vine's nature to grow upward before seeking other paths.

FIG. 4B shows this trellis configuration in end view.

FIG. 5A illustrates the advanced growth stage. It shows how growth has continued and the grid 100 has been raised vertically upward carrying all shoots 70 to an upright position. The amount of distance that the grid is raised depends on the length of the shoots. The timing of this operation depends on many variables including rate of shoot growth and varietal growth habit. In this embodiment, the new position of the grid (or catch wires, not shown, supporting the grid) is again secured to the posts 20 with post clips 80. The vines are then allowed to continue growing until the new growth requires a second movement of the positioning grid. The timing of the grid adjustment is described in conjunction with FIG. 8 below.

The grid should be moved before bloom. In the rare case that a vine does not reach 2 feet of growth prior to bloom then the grid can be raised one half of the average shoot length just prior to bloom. The suggested bloom timing parameter is listed because the tendril attachments within the canopy become more active after bloom and the risk of shoot damage is greater. Moving the grid out of the fruit zone prior to bloom also benefits the evolving flower cluster and berry set by providing an unobstructed area for the flowers to set fruit without further damage.

FIG. 5B shows this trellis configuration in end view. The arrow indicates the direction of grid movement.

FIG. 6A depicts additional growth stages, showing the canopy after the vines have progressed to a point where the positioning grid 100 has been again raised to a level corresponding to the growth. The timing of the second grid adjustment is described in conjunction with FIG. 8 below.

The number of moves that are required to completely position a canopy for all the seasonal growth can be whatever is required for the existing conditions. Usually one or two grid movements are needed to properly place the vine shoots in the optimum location.

FIG. 6B shows the trellis configuration of FIG. 6A in end view.

FIG. 7A depicts the post harvest stage, which is the final position of the grid 100 for the remainder of the year. It has been raised to its maximum height on the posts to facilitate winter pruning and tie operations for the next year's cycle. The final seasonal lift of the grid is performed when the vines have reached dormancy. The timing can be anywhere after harvest and before pruning for the next season.

FIG. 7B shows this trellis configuration in end view.

Figure 8:
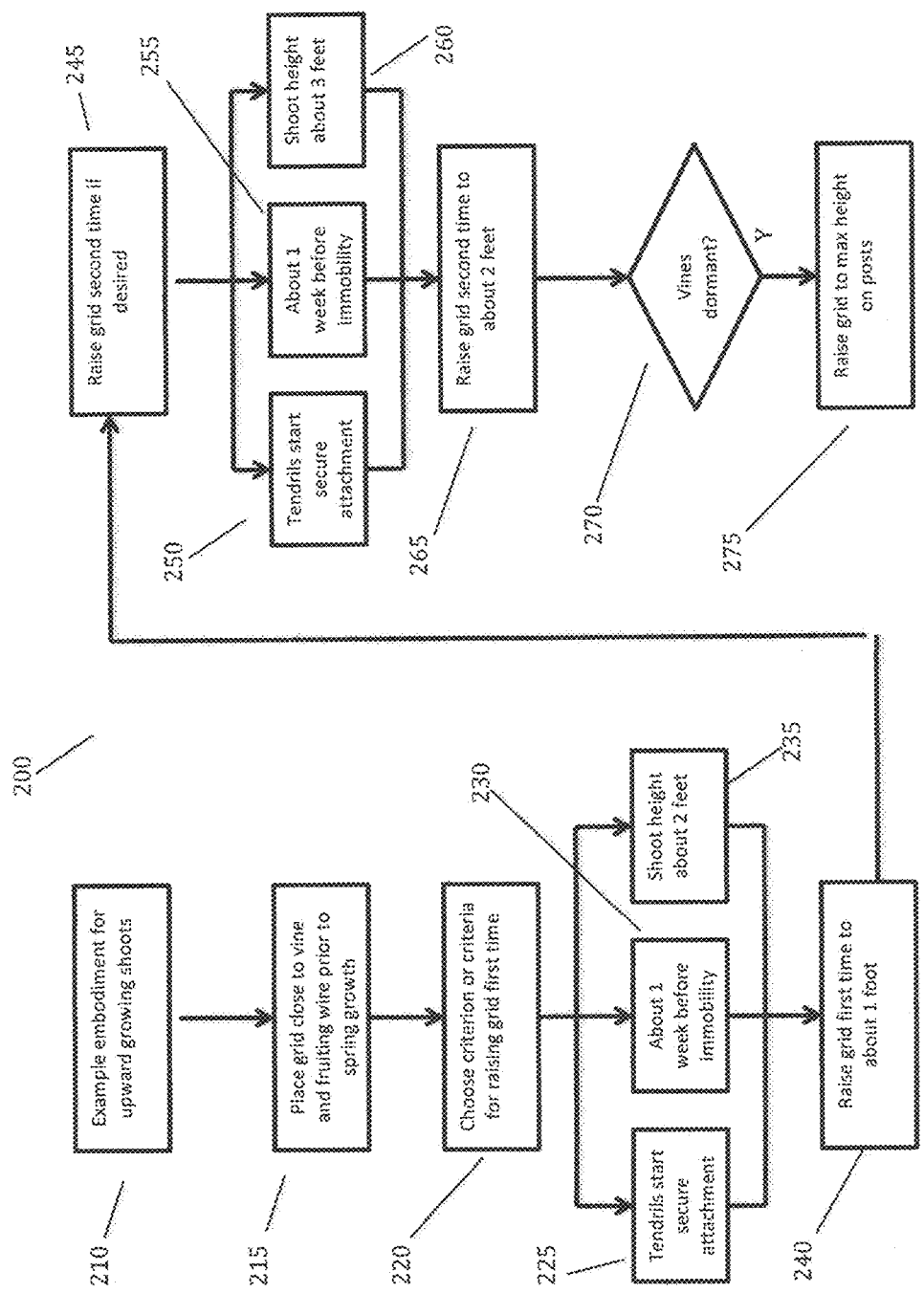
FIG. 8 is a flowchart describing the training procedure for an example embodiment, with particular emphasis on the timing of grid adjustment.

FIG. 8 is a flow chart 200 illustrating an example embodiment for the timing of grid adjustment. Step 210 indicates the example is for upward growing shoots. It is clear that the same principles apply for downward growing shoots, namely that tendril attachment, foliage density, shoot length and approaching immobility can be used, in isolation or in combination, to determine optimum timing for making the grid adjustments. The embodiment shown however, is for upward growing shoots.

Step 215 shows that the grid is placed close to the vine and fruiting wire prior to (or at least no later than) spring growth, as illustrated in FIGS. 3A and 4A above. For most complete shoot capture, the grid is curved over, draped over or encircles the fruiting cordon or cane, as illustrated in FIGS. 16A and B, 17A, and 18A.

Step 220 indicates that there are criteria that determine the optimum timing of grid adjustment. Important factors are the length of new shoot growth, tendril attachment to all parts of the canopy including wires and the grid, foliage density, and the realization that waiting too long will result in immobilization of the grid itself. Moving the grid upwards too soon will result in loss of control of the foliage and risk future growth outside of the grid.

Step 225 shows that tendril attachment is a factor to consider because allowing too much tendril attachment will either immobilize the grid or inflict excessive damage to the tendrils and subsequently the shoots when the grid is repositioned. Thus, step 225 indicates that one parameter that can be used as a criterion is to move the grid before the attachments become too secure and widespread.

Step 230 relates that approaching immobility due to tendril attachment and/or foliage density is an indicator to raise the grid.

Although the experienced eye can judge when the tendril attachment and or foliage density will soon cause grid immobility, a more specific criterion of shoot length is provided for the general grower in step 235. The formula is as follows: The first lift of the grid occurs before bloom and after the shoots have grown to reach a minimum average length of about 2 feet.

In step 240 in this embodiment the grid is raised about 1 foot above the initial resting position shown in FIGS. 3A and 4A. As noted, in the rare case of when a vine does not reach 2 feet of growth prior to bloom then the grid is raised one half of the average shoot length just prior to bloom. If the grid was initially configured to drape over or encircle the cordon or cane, then the grid should be returned to a normal resting, nominally flat, configuration, and positioned in the desired training direction.

Now that the grid is in a new position, the same logic is used to determine the timing of the next grid adjustment, if desired, with respect to the new position. Often just one grid adjustment proves satisfactory, in which case step 245 leads to step 270. If a further adjustment is used, steps 245-265 follow the same sequence as steps 220-240, except that the second grid adjustment, when used, can be determined by when the shoot height is about 3 feet, as indicated in step 260, and the grid is raised the second time to about 2 feet, as shown in step 265. In the rare case of when a vine does not reach 3 feet of growth prior to bloom then the grid is raised one half of the average shoot length approximately two weeks after bloom.

Steps 270 and 275 relate to the post-harvest stage when the vines have reached dormancy. The grid can be raised to maximum height on the posts. The timing can be anywhere after harvest and before pruning for the next season.

The above height formula is a guide to be tempered with the ongoing field observations of shoot length, tendril attachment, and foliage density.

In general, the goal is to capture substantially all shoots as they grow in the linear array of spaces, wherein substantially each shoot has its own individual space through which to grow.

This completes the VLSP positioning sequence for the first exampled embodiment.

Experiments Conducted on First Embodiment

This novel training concept has been verified by field trials conducted in a private vineyard in 2012 and 2013. The experiments will now be described.

Test Vines

The VLSP grid and method was used on four separate grape varieties at different locations of the vineyard.

Four rows comprising 240 vines of the hybrid variety Frontenac were tested using the grid system. The remaining nine rows were used as a control. The Frontenac variety was chosen for this test because of it's natural tendency to grow in a disorganized and difficult to manage growth habit. The catch wire grid combination was raised two times during the growing season and this proved satisfactory to prevent the shoots from being noticeably entangled.

Two rows of the hybrid variety Traminette were also tested. The grid system was placed on an existing vertical shoot positioned trellis and raised twice according to this variety's rate of growth. Results were similar to the Frontenac test with good separation of the vine shoots.

Two *vitis vinifera* varieties were also tested. They were Pinot Gris and Dornfelder. These varieties were chosen to demonstrate the value of using the concept on a variety of vines that grew naturally upright but still demanded the highest quality canopy possible. The Pinot Gris and Dornfelder vines only required one re-positioning of the grid due to their upright growth habit. The shoots remained positioned for the remainder of the growing season and showed a high degree of canopy quality with each shoot substantially fixed in the optimum position.

Control Vines

In each test case the remaining control vines within the selected blocks were trained using the traditional methods of three sets of catch wires and hand positioning of the shoots. The control vines needed catch wire clips to be installed at strategic locations to prevent any future lateral movement of the shoots. One clip per vine was used and this resulted in crowding of the foliage at clip locations. This is an undesirable side effect of conventional hand positioning with clips.

Results of Experiment

The result was that for the grid system it took 1 hour per acre regardless of the variety tested to adjust the grid-catch wire elevation, verses 5 hours per acre using conventional methods to disentangle the vine shoots and re-position them by hand. Thus for the same amount of foliage separation, the grid system was five times more efficient. Fruit quality was not measured quantitatively but was visibly comparable between the two methods.

The VLSP system was found to reduce shoot positioning labor costs by approximately 80% while providing a higher overall quality of the vine canopy. The system fixed the vine shoots in their optimum position to absorb more sunlight and eliminated the need to reposition the shoots for the remainder of the growing season.

Further Trials In The 2014 Growing Season

After an exceptionally cold winter that killed 10% of established vines and injured many others, the VLSP grid system was again tested. Due to poor and uneven growth on some damaged varieties the trial did not consistently result in an improved canopy. However, where vine injury was not an issue the VLSP system again resulted in evenly spaced shoots and improved canopy architecture. It was concluded that the method could not improve a damaged canopy but continued to work well on healthy vines.

Other Embodiments

Figure 1A:
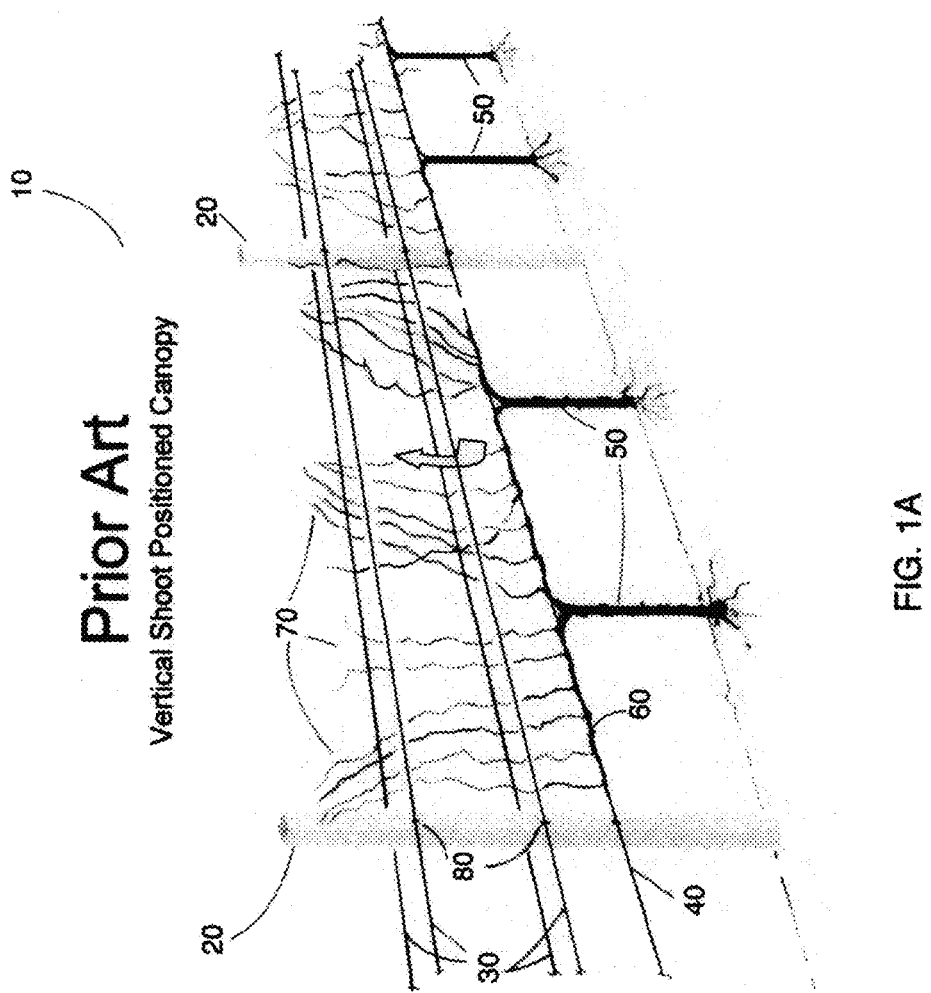
FIG. 1A shows a perspective view depicting the prior art of a Vertical Shoot Positioned canopy, showing how shading can occur.

The first embodiment, described above, was an illustration of the application of the novel VLSP (Vertical and Lateral Shoot Positioning) System, as shown in FIGS. 2A through 7B, to improving the conventional VSP (Vertical shoot positioning) system that was previously described and shown in FIG. 1A. Most trellises 10 consist of posts 20, a fruiting wire or wires 40, and catch wire or wires 30 and are adaptable to VLSP training. For example, many other conventional trellising systems commonly used for grapes can utilize the novel VLSP system as illustrated in the first embodiment with little or no modification on their upright growing shoots because they too train a large portion of their shoots in a vertically upright position. These include the Scott Henry, Lyre, and Smart-Dyson training systems. These will now be described and any modifications noted.

The Scott Henry system is a vertically divided trellis that is a variation of the VSP. Half of the shoots are trained upward from one cordon or cane and the other half downward on a different cordon or cane. The upper portion of the system closely resembles the VSP system and the lower portion resembles an upside down VSP.

The Smart-Dyson system is similar to the Scott Henry system except that the upward and downward growing shoots originate from the same cordon or cane, whereas the Scott Henry downward shoots originate from different cordons or canes than the upward growing shoots.

The Lyre system is also horizontally divided like the Geneva double Curtin but the shoots are trained upward and in a Vee configuration. It is also used for high yields and where the vines need to be spread out over a larger surface area. The upward growing shoots remain relatively vigorous and they are also separated into two separate canopies.

A second embodiment can be used for any downward growing training system, such as the High Cordon (also known as High single curtain or High Bi-Lateral Cordon) training system, shown in FIGS. 11A and B. The High Cordon system trains a single or double curtain of downward growing shoots 70 arising from two cordons or canes 60 extending along a top wire 40 of the trellis in each direction, the ends of which approach the ends of the cordons from neighboring vines. The shoots are trained downward.

In this case, the grid 100 is initially placed close to the cordon or cane and high fruiting wire prior to spring growth as shown in FIGS. 11A and B. The shoots initially grow upward, and as they grow, they are carefully redirected in a downward direction by moving the grid into the position shown in FIG. 11B. Hence from this point on, the system works the same as for upward growing vertical shoots, but the grid is moved in the opposite direction. Thus the second embodiment provides the same benefits (protection from entanglement due to wind and reduction of foliage overlap) as the first embodiment.

The downward growing training systems include the Geneva Double Curtin, High Cordon, Geneva Double Curtain Bilateral Cordon, and include other systems in which a significant portion of shoots are trained in the downward direction, such as Scott Henry and Smart-Dyson.

The Geneva Double Curtin trellising system differs from the vertical systems in that the vine is trained to wires mounted on a cross bar that is attached to the posts. It is horizontally divided and the shoots are trained downward. It is used in high yield vineyards and has a devigorating effect on the shoots. There are two separate foliage canopies with this system.

A third embodiment addresses horizontally trained vines and shoots. In this case the grid is oriented in a more vertical position, and the grid is adjusted horizontally as the vine or vine shoots grow. The ends of the grid, or extensions of the grid, may be slid horizontally along a wire or pole, or reattached at different points along a wire or pole, or otherwise suspended above the ground. The grid and vines or shoots may be close to the ground to enable heavy fruit to rest on the ground, or may be considerably above the ground to allow for, for instance, ventilation or protection from animals. It would be very appropriate for the three dimensional version of the grid to be used in this application. For example, three grids, coupled together by very flexible lines, are be placed in close contact with each other at the beginning of the growing season, and the vines or shoots allowed to grow into nearby openings in the grid, or gently placed there by hand. As the vine or shoots grow, the three dimensional grid is adjusted, the leading grid pulling the next and so forth. This can be the apparatus shown in FIG. 10, but aligned horizontally instead of vertically (as would be used for vertically trained shoots).

A fourth embodiment uses a grid whose transverse elements are mainly supported at only one end, having the overall appearance of a comb shape, as shown in FIG. 9A. For example, a large comb, made of mostly stiff but also slightly flexible plastic, like a pocket comb, can be employed to separate foliage in ground dwelling vines. The teeth of the comb are separated in roughly the same order of magnitude of distance as the distance between vines or shoot that are desired to be separated. The teeth of the combs are pushed into the soil and used to separate vines or vine shoots. At appropriate points in the growing season, the comb is slid or repositioned further along the growing vine or shoot.

From the foregoing description, it can be seen that the present invention comprises a method, apparatus, and system for using an adjustable grid to train vines and vine shoots. It will be appreciated by those skilled in the art that changes could be made to the embodiments described above without departing from the broad inventive concepts thereof. It is understood, therefore, that this invention is not limited to the particular embodiments described but it is intended to cover all modifications which are within the scope and spirit of the invention as described by the appended claims.

I claim:
1. A method for training vegetative shoots comprising:
   a. providing a fruiting wire supported by posts;
   b. attaching a cordon or cane to said fruiting wire;
   c. providing a grid having a length to width ratio of at least nine to one;
   d. positioning said grid in proximity to a cordon or cane; and
   e. repositioning said grid farther from said cordon or cane at least once as shoots arising from said cordon or cane grow through said grid.

2. The method of claim 1 wherein said positioning further comprises bending said grid over said cordon or cane.

3. The method of claim 2 wherein said positioning further comprises bending said grid around said cordon or cane in substantially a closed loop.

4. The method of claim 3 wherein said positioning further comprises attaching said grid to itself after being bent around said cordon or cane in substantially a closed loop.

5. The method of claim 1 further comprising changing the position of said grid at different stages of growth of said shoots.

6. The method of claim 1 further comprising changing the shape of said grid at different positions corresponding to different stages of growth of said shoots.

7. A method for training vegetative shoots comprising:
   a. providing a plurality of posts;
   b. supporting an elevated, longitudinal fruiting wire by said posts;
   c. attaching a cordon or cane to said fruiting wire, the cordon or cane generating said shoots during growing season;
   d. providing a first grid configured and sized to provide openings for said shoots to grow through, said first grid having a length to width ratio of at least nine to one; and
   e. adjustably attaching said first grid to said posts, whereby said first grid is able to be positioned in proximity to said cordon or cane and repositioned later.

8. The method of claim 7 further comprising adjustably fastening said first grid to said posts by use of a plurality of post clips, staples, slots in said posts, or a cross bar extending from said posts.

9. The method of claim 7 further comprising bending said first grid over said cordon or cane.

10. The method of claim 7 further comprising bending said first grid around said cordon or cane in substantially a closed loop whereby it captures substantially all emerging shoots from said cordon or cane.

11. The method of claim 10 further comprising fastening said first grid to itself after being bent in said substantially a closed loop.

12. The method of claim 11 wherein the method of fastening is forcing longitudinal elements together in a forced fit, containing one longitudinal element into a cavity in another longitudinal element, or by magnetically bonding longitudinal elements together.

13. The method of claim 7 further comprising providing a second grid and a plurality of connectors between said first grid and said second grid whereby said first grid and said second grid engage said shoots at different locations along said shoots.

14. A method for training vegetative shoots comprising:
a. providing a plurality of posts;
b. supporting an elevated, longitudinal fruiting wire by said plurality of posts;
c. attaching a cordon or cane to said fruiting wire, the cordon or cane generating said shoots during growing season;
d. adjustably attaching at least one support wire to said posts by a plurality of first fasteners;
e. attaching a first grid to said at least one support wire wherein said first grid is configured and sized to provide openings for said shoots to grow through, said first grid having a length to width ratio of at least nine to one.

15. The method of claim 14 further comprising adjustably fastening said at least one support wire to said posts by use of a plurality of post clips, staples, slots in said posts, or a cross bar extending from said posts.

16. The method of claim 14 further comprising adjusting the position of said first grid whereby said first grid continues to separate said shoots during the growing season.

17. The method of claim 14 further comprising attaching said first grid to said at least one support wire by a plurality of second fasteners.

18. The method of claim 14 further comprising attaching said first grid to said at least one support wire by an integral cavity in said longitudinal elements that captures said at least one support wire.

19. The method of claim 18 further comprising retaining said at least one support wire in said integral cavity by means of a constricted opening along the length of said first longitudinal element, said constricted opening serving as an entranceway to said integral cavity whereby said integral cavity retains said at least one support wire.

20. The method of claim 14 further comprising configuring said first grid to bend over said cordon or cane.

21. The method of claim 20 further comprising configuring said first grid to bend around said cordon or cane in substantially a closed loop thereby enclosing said cordon or cane and capturing substantially all shoots.

22. The method of claim 21 further comprising fastening first grid onto itself after being bent in said substantially a closed loop.

23. The method of claim 22 wherein said first grid is fastened onto itself by inserting one longitudinal element into a cavity in another longitudinal element, forcing one longitudinal element into a cavity in another longitudinal element, or magnetically bonding two longitudinal elements together.

24. The method of claim 14 further comprising providing a second grid and a plurality of connectors between said first grid and said second grid whereby said first grid and second grid engage said shoots at different locations along said shoots.

25. The method of claim 14 wherein said attaching of said first grid to said at least one support wire is discontinuous, with alternating sections of attachment and non-attachment, whereby another grid may be discontinuously attached using the interspaces of said first grid attachment without interfering with the attachment of said first grid.

* * * * *